United States Patent
Witt et al.

(10) Patent No.: US 6,256,728 B1
(45) Date of Patent: Jul. 3, 2001

(54) PROCESSOR CONFIGURED TO SELECTIVELY CANCEL INSTRUCTIONS FROM ITS PIPELINE RESPONSIVE TO A PREDICTED-TAKEN SHORT FORWARD BRANCH INSTRUCTION

(75) Inventors: David B. Witt; William M. Johnson, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/110,519

(22) Filed: Jul. 6, 1998

Related U.S. Application Data

(60) Provisional application No. 60/065,878, filed on Nov. 17, 1997.

(51) Int. Cl.[7] .................................................. G06F 15/00
(52) U.S. Cl. ............................................................ 712/236
(58) Field of Search ...................................... 712/233–240

(56) References Cited

U.S. PATENT DOCUMENTS

| | | | |
|---|---|---|---|
| 5,136,697 | 8/1992 | Johnson | 712/239 |
| 5,142,634 | 8/1992 | Fite et al. | 712/240 |
| 5,794,028 | * 8/1998 | Tran | 712/240 |
| 5,799,180 | * 8/1998 | Shiell et al. | 712/234 |
| 5,805,878 | * 9/1998 | Rahman et al. | 712/239 |
| 5,809,294 | * 9/1998 | Ando | 712/233 |
| 5,903,750 | * 5/1999 | Yeh et al. | 712/236 |
| 5,918,044 | * 6/1999 | Levitan et al. | 711/125 |

OTHER PUBLICATIONS

Johnson of Advanced Micro Devices, "Superscalar Microprocessor Design," published by P T R Prentice–Hall, Inc., 1991, pp. 63–65.

IBM, "Instruction scan for an early decode resolution of a branch instruction", 11/1980, pp. 2600–2604.*

* cited by examiner

*Primary Examiner*—Richard Booth
*Assistant Examiner*—S. Whitmore
(74) *Attorney, Agent, or Firm*—Conley, Rose & Tayon, PC; Lawrence J. Merkel

(57) ABSTRACT

A processor is configured to detect a branch instruction have a forward branch target address within a predetermined range of the branch fetch address of the branch instruction. If the branch instruction is predicted taken, instead of canceling subsequent instructions and fetching the branch target address, the processor allows sequential fetching to continue and selectively cancels the sequential instructions which are not part of the predicted instruction sequence (i.e. the instructions between the predicted taken branch instruction and the target instruction identified by the forward branch target address). Instructions within the predicted instruction sequence which may already have been fetched prior to predicting the branch instruction taken may be retained within the pipeline of the processor, and yet subsequent instructions may be fetched.

25 Claims, 13 Drawing Sheets

PROCESSOR CONFIGURED TO SELECTIVELY CANCEL INSTRUCTIONS FROM ITS PIPELINE RESPONSIVE TO A PREDICTED-TAKEN SHORT FORWARD BRANCH INSTRUCTION

This Application claims benefit of priority to the Provisional Application serial No. 60/065,878, entitled "High Frequency, Wide Issue Microprocessor" filed on Nov. 17, 1997 by Witt. The Provisional Application is incorporated herein by reference in its entirety.

BACKGROUND OF THE INVENTION

1. Field of the Invention

The present invention is related to the field of processors and, more particularly, to branch prediction and fetch mechanisms within processors.

2. Description of the Related Art

Superscalar processors attempt to achieve high performance by dispatching and executing multiple instructions per clock cycle, and by operating at the shortest possible clock cycle time consistent with the design. To the extent that a given processor is successful at dispatching and/or executing multiple instructions per clock cycle, high performance may be realized. In order to increase the average number of instructions dispatched per clock cycle, processor designers have been designing superscalar processors which employ wider issue rates. A "wide issue" superscalar processor is capable of dispatching (or issuing) a larger maximum number of instructions per clock cycle than a "narrow issue" superscalar processor is capable of dispatching. During clock cycles in which a number of dispatchable instructions is greater than the narrow issue processor can handle, the wide issue processor may dispatch more instructions, thereby achieving a greater average number of instructions dispatched per clock cycle.

In order to support wide issue rates, it is desirable for the superscalar processor to be capable of fetching a large number of instructions per clock cycle (on the average). For brevity, a processor capable of fetching a large number of instructions per clock cycle (on the average) will be referred to herein as having a "high fetch bandwidth". If the superscalar processor is unable to achieve a high fetch bandwidth, then the processor may be unable to take advantage of the wide issue hardware due to a lack of instructions being available for issue.

Several factors may impact the ability of a particular processor to achieve a high fetch bandwidth. For example, many code sequences have a high frequency of branch instructions, which may redirect the fetching of subsequent instructions within that code sequence to a branch target address specified by the branch instruction. Accordingly, the processor may identify the branch target address after fetching the branch instruction. Subsequently, the next instructions within the code sequence may be fetched using the branch target address. Processors attempt to minimize the impact of branch instructions on the fetch bandwidth by employing highly accurate branch prediction mechanisms and by generating the subsequent fetch address (either branch target or sequential) as rapidly as possible.

As used herein, a branch instruction is an instruction which specifies the address of the next instructions to be fetched. The address may be the sequential address identifying the instruction immediately subsequent to the branch instruction within memory, or a branch target address identifying a different instruction stored elsewhere in memory. Unconditional branch instructions always select the branch target address, while conditional branch instructions select either the sequential address or the branch target address based upon a condition specified by the branch instruction. For example, the processor may include a set of condition codes which indicate the results of executing previous instructions, and the branch instruction may test one or more of the condition codes to determine if the branch selects the sequential address or the target address. A branch instruction is referred to as taken if the branch target address is selected via execution of the branch instruction, and not taken if the sequential address is selected. Similarly, if a conditional branch instruction is predicted via a branch prediction mechanism, the branch instruction is referred to as predicted taken if the branch target address is predicted to be selected upon execution of the branch instruction and is referred to as predicted not taken if the sequential address is predicted to be selected upon execution of the branch instruction.

Unfortunately, even if highly accurate branch prediction mechanisms are employed, fetch bandwidth may still suffer. Typically, a plurality of instructions are fetched by the processor, and a first branch instruction within the plurality of instructions is detected. Instructions subsequent to the first branch instruction are discarded if the branch instruction is predicted taken, and the branch target address is fetched. Accordingly, the number of instructions fetched during the clock cycle in which a branch instruction is fetched and predicted taken is limited to the number of instructions prior to and including the first branch instruction within the plurality of instructions being fetched. Since branch instructions are frequent in many code sequences, this limitation may be significant. Performance of the processor may be decreased if the limitation to the fetch bandwidth leads to a lack of instructions being available for dispatch. A method for increasing the achievable fetch bandwidth in the presence of predicted taken branch instructions is therefore desired.

SUMMARY OF THE INVENTION

The problems outlined above are in large part solved by a processor in accordance with the present invention. The processor is configured to detect a branch instruction having a forward branch target address within a predetermined range of the branch fetch address of the branch instruction. If the branch instruction is predicted taken, instead of canceling subsequent instructions and fetching the branch target address, the processor allows sequential fetching to continue and selectively cancels the sequential instructions which are not part of the predicted instruction sequence (i.e. the instructions between the predicted taken branch instruction and the target instruction identified by the forward branch target address). Advantageously, instructions within the predicted instruction sequence which may already have been fetched prior to predicting the branch instruction taken may be retained within the pipeline of the processor, and yet subsequent instructions may be fetched. Higher fetch bandwidth may thereby be achieved, and hence more instructions may be available in wider superscalar processors.

Broadly speaking, the present invention contemplates a method for fetching instructions in a processor. A plurality of instructions are fetched. A first branch instruction is detected within the plurality of instructions. The first branch instruction has a forward branch target address. The first branch instruction is predicted. Instructions within the plurality of instructions which are between the first branch instruction and a subsequent instruction within the plurality of instructions identified by the forward branch target address are cancelled. The canceling is performed responsive to selecting a taken prediction for the first branch instruction and the forward branch target address being within a predetermined range of a first branch fetch address corresponding to the first branch instruction. Additionally, the subsequent instruction is retained within the plurality of instructions even if the predicting selects the taken prediction responsive to the forward branch target address being within the predetermined range.

The present invention further contemplates a processor comprising a branch scanner configured to identify a first branch instruction within a plurality of instructions, a branch history table, and a forward collapse unit. Coupled to the branch scanner, the branch history table is configured to select a first branch prediction from a plurality of branch predictions stored therein responsive to the first branch instruction identified by the branch scanner. Coupled to the branch scanner and the branch history table, the forward collapse unit is configured to indicate: (i) which instructions within the plurality of instructions and subsequent to the first branch instruction to cancel, and (ii) which instructions within the plurality of instructions and subsequent to the first branch instruction to retain. The forward collapse unit is responsive to the first branch prediction indicating taken and the first branch instruction having a forward branch target address within a predetermined range of a first branch fetch address corresponding to the first branch instruction.

Moreover, the present invention contemplates a computer system comprising a processor coupled to an input/output (I/O) device. The processor is configured to fetch a plurality of instructions and to identify a first branch instruction within the plurality of instructions. Additionally, the processor is configured to selectively cancel and retain instructions within the plurality of instructions and subsequent to the first branch instruction responsive to predicting the first branch instruction taken and the first branch instruction having a forward branch target address within a predetermined range of a first branch fetch address corresponding to the first branch instruction. The I/O device is configured to communicate between the computer system and another computer system to which the I/O device is coupled.

BRIEF DESCRIPTION OF THE DRAWINGS

Other objects and advantages of the invention will become apparent upon reading the following detailed description and upon reference to the accompanying drawings in which.

Figure 1:
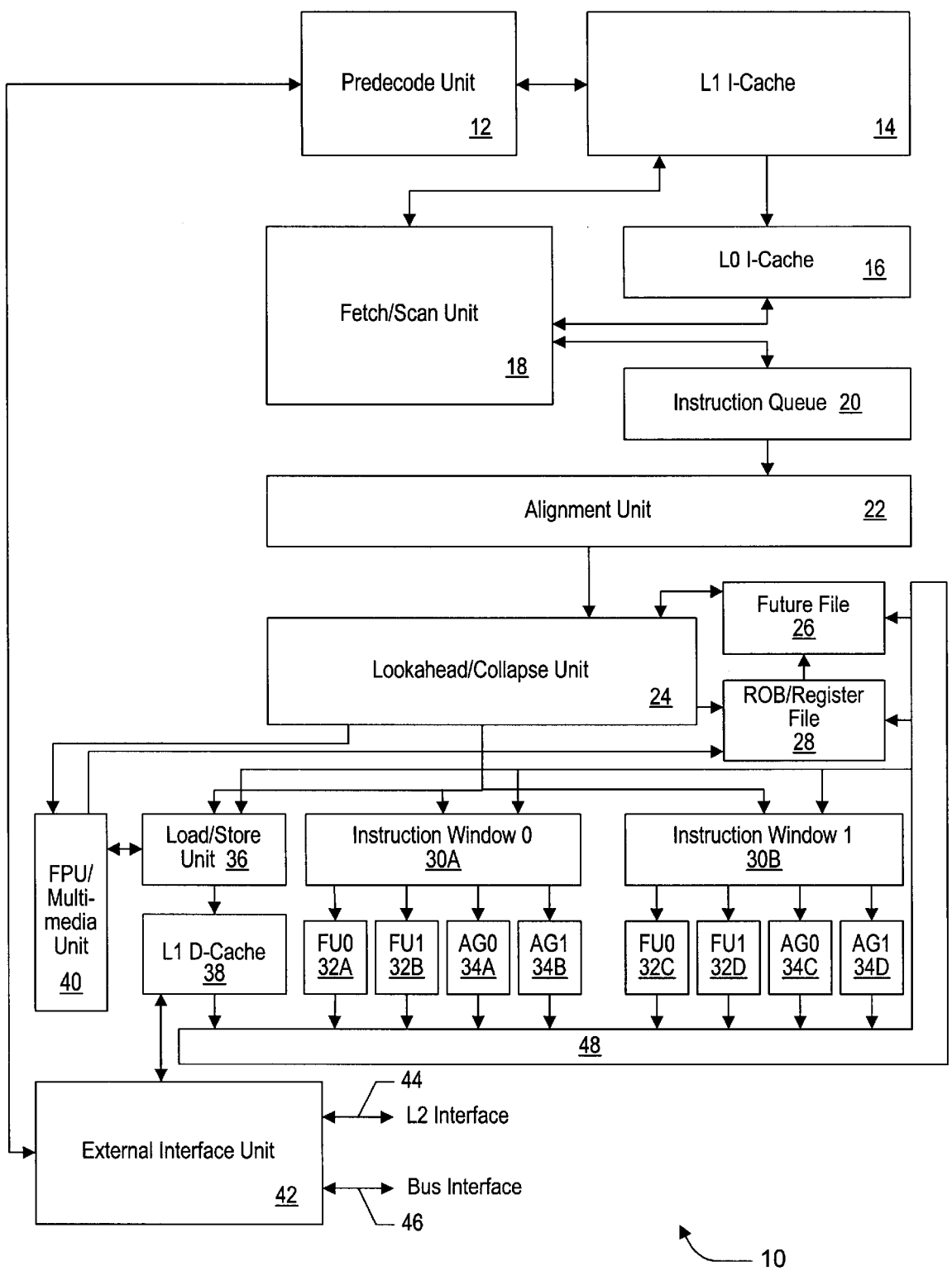
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar processor 10 is shown. Other embodiments are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a lookahead/collapse unit 24, a future file 26, a reorder buffer/register file 28, a first instruction window 30A, a second instruction window 30B, a plurality of functional units 32A, 32B, 32C, and 32D, a plurality of address generation units 34A, 34B, 34C, and 34D, a load/store unit 36, an L1 D-cache 38, an FPU/multimedia unit 40, and an external interface unit 42. Elements referred to herein by a particular reference number followed by various letters will be collectively referred to using the reference number alone. For example, functional units 32A, 32B, 32C, and 32D will be collectively referred to as functional units 32.

In the embodiment of FIG. 1, external interface unit 42 is coupled to predecode unit 12, L1 D-cache 38, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 I-cache 16 and to instruction queue 20. Instruction queue 20 is coupled to alignment unit 22, which is further coupled to lookahead/collapse unit 24. Lookahead/collapse unit 24 is further coupled to future file 26, reorder buffer/register file 28, load/store unit 36, first instruction window 30A, second instruction window 30B, and FPU/multimedia unit 40. FPU/multimedia unit 40 is coupled to load/store unit 36 and to reorder buffer/register file 28. Load/store unit 36 is coupled to L1 D-cache 38. First instruction window 30A is coupled to functional units 32A–32B and to address generation units 34A–34B. Similarly, second instruction window 30B is coupled to functional units 32C–32D and address generation units 34C–34D. Each of L1 D-cache 38, functional units 32, and address generation units 34 are coupled to a plurality of result buses 48 which are further coupled to load/store unit 36, first instruction window 30A, second instruction window 30B, reorder buffer/register file 28, and future file 26.

Generally speaking, processor 10 is configured a fetch instructions from L0 I-cache 16. Fetch/scan unit 18 is configured to scan the instructions in order to detect the branch instructions included therein, and is further configured to predict the detected branch instructions. If a branch instruction is predicted taken and has a forward branch target address, fetch/scan unit 18 is configured to selectively cancel one or more of the instructions subsequent to the predicted branch instruction while retaining other ones of the instructions subsequent to the predicted branch instruction. More particularly, if the forward branch target address is within a predetermined range of the branch fetch address of the corresponding branch instruction, the instructions between the predicted branch instruction and a subsequent instruction within the plurality instructions which is stored at the forward branch target address are cancelled while the subsequent instruction and any succeeding instructions within the plurality of instructions are retained. Instead of fetching the forward branch target address from L0 I-cache 16, the sequential address is fetched as one or more of the instructions at the target address have already been fetched concurrent with the branch instruction and have been retained within the pipeline of processor 10.

Advantageously, the achievable fetch bandwidth may be improved by retaining target instructions which are fetched concurrently with the branch instruction having the forward branch target address. Instead of discarding the target instructions which have already been fetched and fetching those target instructions during a subsequent fetch using the forward branch target address, the target instructions are retained and instructions sequential to the previously fetched target instructions are fetched.

In one embodiment, fetch/scan unit 18 is configured to detect and predict up to two branch instructions within a run of instructions fetched from for L0 I-cache 16 during a clock cycle. If the first detected branch instruction is predicted taken and has a forward branch target address, instructions are selectively cancelled as described above. Fetch/scan unit 18 then determines if the second detected branch instruction is still within the run of instructions (i.e. the second branch instruction was not cancelled). If the second detected branch instruction was not cancelled, is predicted taken, and has a forward branch target address, instructions subsequent to the second detected branch instruction are selectively cancelled and retained in a manner similar to the processing of the first detected branch instruction. Advantageously, up to two branch instructions may be predicted per fetch, and fetch bandwidth may be even further increased.

As used herein, the term "forward branch target address" refers to a branch target address which is numerically greater than the fetch address of the branch instruction specifying the branch target address. The fetch address of the branch instruction (or "branch fetch address") is the address at which the branch instruction is stored. Furthermore, the term canceling instructions refers to invalidating the instructions within the pipeline subsequent to fetching the instructions. For example, the instructions may be invalidated within instruction queue 20. The term "squashing instructions" may also be used herein to refer to canceling the instructions. An instruction is referred to as being between a branch instruction and a subsequent target instruction if the instruction is stored at a fetch address which is numerically greater than the branch fetch address and numerically less then the branch target address specified by the branch instruction stored at the branch fetch address. Additionally, a forward target address is "within a predetermined range" of the corresponding branch fetch address if the difference between the branch fetch address and the branch target address is less than or equal to a predetermined value (e.g. 64 bytes, in one embodiment).

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes being decoded in an instruction cache (e.g. L1 I-cache 14 and/or L0 I-cache 16).

In one embodiment, processor 10 employs two bits of predecode information per instruction byte. One of the bits, referred to as the "start bit", indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

The second predecode bit used in this embodiment, referred to as the "control transfer" bit, identifies which instructions are branch instructions. The control transfer bit corresponding to the initial byte of an instruction indicates whether or not the instruction is a branch instruction. The control transfer bit corresponding to subsequent bytes of the instruction is a don't care except for relative branch instructions having a small displacement field. According to one particular embodiment, the small displacement field is an 8 bit field. Generally, a "small displacement field" refers to a displacement field having fewer bits than the target address generated by branch instructions. For relative branch instructions having small displacement fields, the control transfer bit corresponding to the displacement byte is used as described below.

In addition to generating predecode information corresponding to the instruction bytes, predecode unit 12 is configured to recode the displacement field of relative branch instructions to actually store the target address in the present embodiment. In other words, predecode unit 12 adds the displacement of the relative branch instruction to the address corresponding to the relative branch instruction as defined by the instruction set employed by processor 10. The resulting target address is encoded into the displacement field as a replacement for the displacement, and the updated displacement field is stored into L1 I-cache 14 instead of the original displacement field. Target address generation is simplified by precomputing relative target addresses, and hence the branch prediction mechanism may operate more efficiently.

In one embodiment of processor 10 which employs the x86 instruction set, predecode unit 12 is configured to recode eight bit and 32 bit displacement fields. The 32 bit displacement fields may store the entirety of the target address. On the other hand, the eight bit displacement field is encoded. More particularly, the eight bit displacement field and corresponding control transfer predecode bit is divided into a cache line offset portion and a relative cache line portion. The cache line offset portion is the cache line offset portion of the target address. The relative cache line portion defines the cache line identified by the target address (the "target cache line") in terms of a number of cache lines above or below the cache line storing the relative branch instruction. A first cache line is above a second cache line if each byte within the first cache line is stored at an address which is numerically greater than the addresses at which the bytes within the second cache line are stored. Conversely, a first cache line is below the second cache line if each byte within the first cache line is stored at an address which is numerically less than the addresses at which the bytes within a second cache line are stored. A signed eight bit displacement specifies an address which is +/−128 bytes of the address corresponding to the branch instruction. Accordingly, the number of above and below cache lines which can be reached by a relative branch instruction having an eight bit displacement is limited. The relative cache line portion encodes this limited set of above and below cache lines. Generally, branch instructions having a small displacement field have displacements within a predefined range, whereas larger displacement fields may store values outside the predefined range.

Tables 1 and 2 below illustrates an exemplary encoding of the predecode information corresponding to a byte in accordance with one embodiment of processor 10.

TABLE 1

Predecode Encoding

| Start Bit | Control Transfer Bit | Meaning |
| --- | --- | --- |
| 1 | 0 | Start byte of an instruction which is not a branch. |
| 1 | 1 | Start byte of a branch instruction. |
| 0 | x | Not an instruction boundary. Control Transfer Bit corresponding to displacement is used on 8-bit relative branches to encode target address as shown in Table 2 below. |

TABLE 2

Target Address Encoding

| Control Transfer Bit | Displacement Byte Most Significant Bits (binary) | Meaning |
| --- | --- | --- |
| 0 | 00 | Within Current Cache Line |
| 0 | 01 | One Cache Line Above |
| 0 | 10 | Two Cache Lines Above |
| 1 | 01 | One Cache Line Below |
| 1 | 10 | Two Cache Lines Below |

Note: Remaining displacement byte bits are the offset within the target cache line. Control Transfer Bit is effectively a direction, and the most significant bits of the displacement byte are the number of cache lines.

Predecode unit 12 conveys the received instruction bytes and corresponding predecode information to L1 I-cache 14 for storage. L1 I-cache 14 is a high speed cache memory for storing instruction bytes and predecode information. L1 I-cache 14 may employ any suitable configuration, including direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line" refers to the unit of allocation of storage in a particular cache. Generally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/physically tagged cache include each translated bit in addition to the bits not used to index. As specified by the x86 architecture, instructions are defined to generate logical addresses which are translated through a segmentation translation mechanism to a linear address and further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and fetch or prefetch addresses for L1 I-cache 14. Instructions fetched from L0 I-cache 16 are scanned by fetch/scan unit 18 to identify instructions for dispatch as well as to locate branch instructions and to form branch predictions corresponding to the located branch instructions. Instruction scan information and corresponding instruction bytes are stored into instruction queue 20 by fetch/scan unit 18. Additionally, the identified branch instructions and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. One embodiment of the prefetch algorithm is set forth in more detail below.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries.

Alignment unit 22 is configured to route instructions identified by instruction queue 20 to a set of issue positions within lookahead/collapse unit 24. In other words, alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Lookahead/collapse unit 24 decodes the instructions provided by alignment unit 22. FPU/multimedia instructions detected by lookahead/collapse unit 24 are routed to FPU/multimedia unit 40. Other instructions are routed to first instruction window 30A, second instruction window 30B, and/or load/store unit 36. In one embodiment, a particular instruction is routed to one of first instruction window 30A or second instruction window 30B based upon the issue position to which the instruction was aligned by alignment unit 22. According to one particular embodiment, instructions from alternate issue positions are routed to alternate instruction windows 30A and 30B. For example, instructions from issue positions zero, two, and four may be routed to the first instruction window 30A and instructions from issue positions one, three, and five may be routed to the second instruction window 30B. Instructions which include a memory operation are also routed to load/store unit 36 for access to L1 D-cache 38.

Additionally, lookahead/collapse unit 24 attempts to generate lookahead addresses or execution results for certain types of instructions. Lookahead address/result generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values.

To accelerate the execution of these instructions, lookahead/collapse unit 24 generates lookahead copies of the ESP and EBP registers for each of instructions decoded during a clock cycle. Additionally, lookahead/collapse unit 24 accesses future file 26 for register operands selected by each instruction. For each register operand, future file 26 may be storing either an execution result or a tag identifying a reorder buffer result queue entry corresponding to the most recent instruction having that register as a destination operand.

In one embodiment, lookahead/collapse unit 24 attempts to perform an address calculation for each instruction which: (i) includes a memory operand; and (ii) register operands used to form the address of the memory operand are available from future file 26 or lookahead copies of ESP/EBP. Additionally, lookahead/collapse unit 24 attempts to perform a result calculation for each instruction which: (i) does not include a memory operand; (ii) specifies an add/subtract operation (including increment and decrement); and (iii) register operands are available from future file 26 or lookahead copies of ESP/EBP. In this manner, many simple operations may be completed prior to instructions being sent to instruction windows 30A–30B.

Lookahead/collapse unit 24 detects dependencies between a group of instructions being dispatched and collapses any execution results generated therein into instructions dependent upon those instruction results. Additionally, lookahead/collapse unit 24 updates future file 26 with the lookahead execution results. Instruction operations which are completed by lookahead/collapse unit 24 (i.e. address generations and/or instruction results are generated and load/store unit 36 or future file 26 and the result queue are updated) are not dispatched to instruction windows 30A–30B.

Lookahead/collapse unit 24 allocates a result queue entry in reorder buffer/register file 28 for each instruction dispatched. In one particular embodiment, reorder buffer/register file 28 includes a result queue organized in a line-oriented fashion in which storage locations for execution results are allocated and deallocated in lines having enough storage for execution results corresponding to a maximum number of concurrently dispatchable instructions. If less than the maximum number of instructions are dispatched, then certain storage locations within the line are empty. Subsequently dispatched instructions use the next available line, leaving the certain storage locations empty. In one embodiment, the result queue includes 40 lines, each of which may store up to six execution results corresponding to concurrently dispatched instructions. Execution results are retired from the result queue in order into the register file included within reorder buffer/register file 28. Additionally, the reorder buffer handles branch mispredictions, transmitting the corrected fetch address generated by the execution of the branch instruction to fetch/scan unit 18. Similarly, instructions which generate other exceptions are handled within the reorder buffer. Results corresponding to instructions subsequent to the exception-generating instruction are discarded by the reorder buffer. The register file comprises a storage location for each architected register. For example, the x86 instruction set defines 8 architected registers. The register file for such an embodiment includes eight storage locations. The register file may further include storage locations used as temporary registers by a microcode unit in embodiments employing microcode units.

Future file 26 maintains the speculative state of each architected register as instructions are dispatched by lookahead/collapse unit 24. As an instruction having a register destination operand is decoded by lookahead/collapse unit 24, the tag identifying the storage location within the result queue portion of reorder buffer/register file 28 assigned to the instruction is stored into the future file 26 storage location corresponding to that register. When the corresponding execution result is provided, the execution result is stored into the corresponding storage location (assuming that a subsequent instruction which updates the register has not been dispatched).

It is noted that, in one embodiment, a group of up to six instructions is selected from instruction queue 20 and moves through the pipeline within lookahead/collapse unit 24 as a unit. If one or more instructions within the group generates a stall condition, the entire group stalls. An exception to this rule is if lookahead/collapse unit 24 generates a split line condition due to the number of ESP updates within the group). Such a group of instructions is referred to as a "line" of instructions herein.

Instruction windows 30 receive instructions from lookahead/collapse unit 24. Instruction windows 30 store the instructions until the operands corresponding to the instructions are received, and then select the instructions for execution. Once the address operands of an instruction including a memory operation have been received, the instruction is transmitted to one of the address generation units 34. Address generation units 34 generate an address from the address operands and forward the address to load/store unit 36. On the other hand, once the execution operands of an instruction have been received, the instruction is transmitted to one of the functional units 32 for execution. In one embodiment, each integer window 30A–30B includes 25 storage locations for instructions. Each integer window 30A–30B is configured to select up to two address generations and two functional unit operations for execution each clock cycle in the address generation units 34 and functional units 32 connected thereto. In one embodiment, instructions fetched from L0 I-cache 16 remain in the order fetched until stored into one of instruction windows 30, at which point the instructions may be executed out of order.

In embodiments of processor 10 employing the x86 instruction set, an instruction may include implicit memory operations for load/store unit 36 as well as explicit functional operations for functional units 32. Instructions having no memory operand do not include any memory operations, and are handled by functional units 32. Instructions having a source memory operand and a register destination operand include an implicit load memory operation handled by load/store unit 36 and an explicit functional operation handled by functional units 32. Instructions having a memory source/destination operand include implicit load and store memory operations handled by load/store unit 36 and an explicit functional operation handled by functional units 32. Finally, instructions which do not have an explicit functional operation are handled by load/store unit 36. Each memory operation results in an address generation handled either by lookahead/collapse unit 24 or address generation units 34. Memory operations and instructions (i.e. functional operations) may be referred to herein separately, but may be sourced from a single instruction.

Address generation units 34 are configured to perform address generation operations, thereby generating addresses for memory operations in load/store unit 36. The generated addresses are forwarded to load/store unit 36 via result buses 48. Functional units 32 are configured to perform integer arithmetic/logical operations and execute branch instructions. Execution results are forwarded to future file 26, reorder buffer/register file 28, and instruction windows 30A–30B via result buses 48. Address generation units 34 and functional units 32 convey the result queue tag assigned to the instruction being executed upon result buses 48 to identify the instruction being executed. In this manner, future file 26, reorder buffer/register file 28, instruction windows 30A–30B, and load/store unit 36 may identify execution results with the corresponding instruction. FPU/multimedia unit 40 is configured to execute floating point and multimedia instructions.

Load/store unit 36 is configured to interface with L1 D-cache 38 to perform memory operations. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor 10 to external memory. If a hit is detected for a memory operation within L1 D-cache 38, the memory operation is completed therein without access to external memory. Load/store unit 36 may receive addresses for memory operations from lookahead/collapse unit 24 (via lookahead address calculation) or from address generation units 34. In one embodiment, load/store unit 36 is configured perform up to three memory operations per clock cycle to L1 D-cache 38. For this embodiment, load/store unit 36 may be configured to buffer up to 30 load/store memory operations which have not yet accessed D-cache 38. The embodiment may further be configured to include a 96 entry miss buffer for buffering load memory operations which miss D-cache 38 and a 32 entry store data buffer. Load/store unit 36 is configured to perform memory dependency checking between load and store memory operations.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1 D-cache 38. Additionally, external interface unit 42 is configured to transfer cache lines discarded by L1 D-cache 38 to memory if the discarded cache lines have been modified to processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
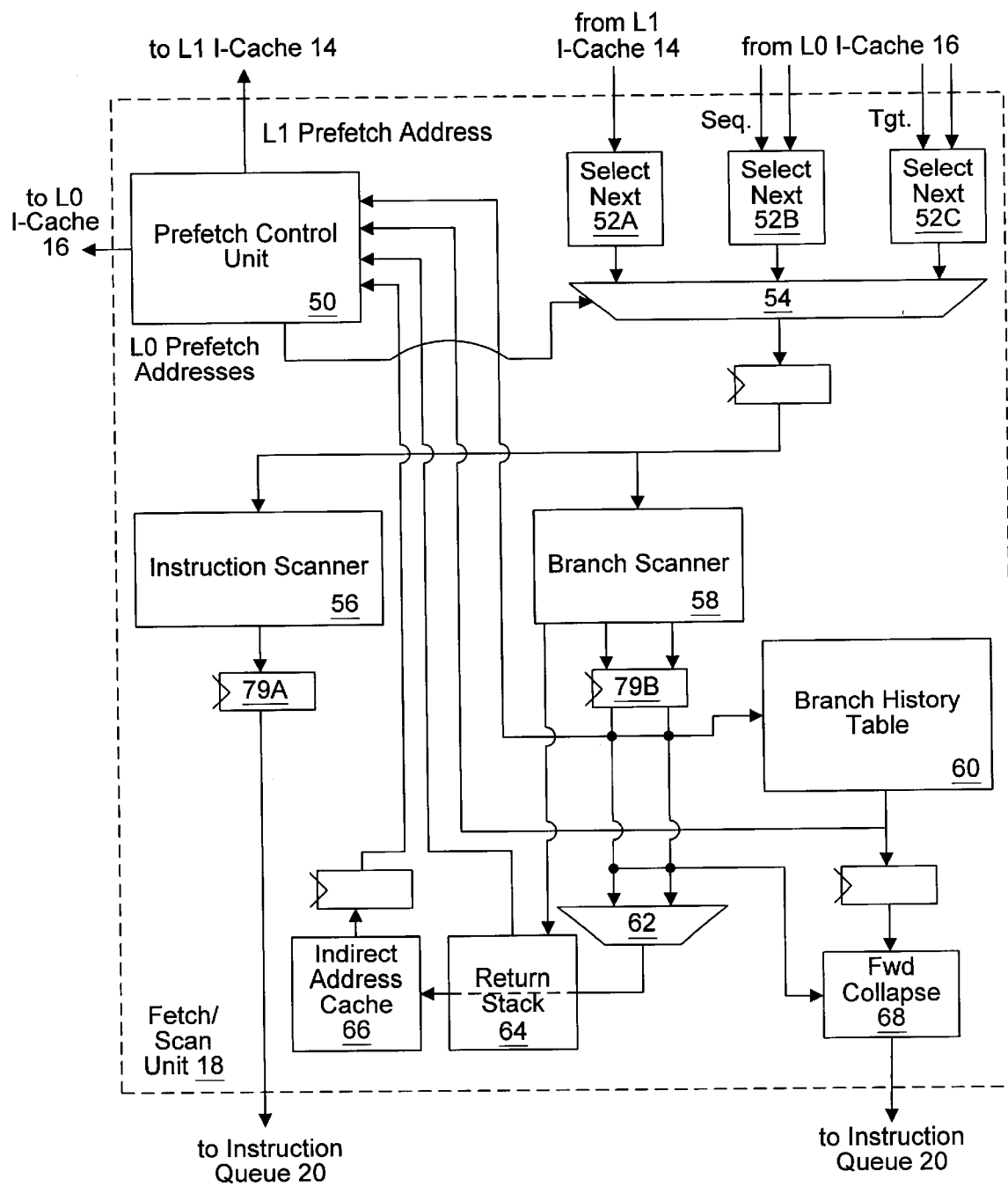
FIG. 2 is a block diagram of one embodiment of a fetch/scan unit shown in FIG. 1.

Turning now to FIG. 2, a block diagram of one embodiment of fetch/scan unit 18 is shown. Other embodiments are possible and contemplated. As shown in FIG. 2, fetch/scan unit 18 includes a fetch control unit 50, a plurality of select next blocks 52A–52C, an instruction select multiplexor (mux) 54, an instruction scanner 56, a branch scanner 58, a branch history table 60, a branch select mux 62, a return stack 64, an indirect address cache 66, and a forward collapse unit 68. Fetch control unit 50 is coupled to L1 I-cache 14, L0 I-cache 16, indirect address cache 66, return stack 64, branch history table 60, branch scanner 58, and instruction select mux 54. Select next block 52A is coupled to L1 I-cache 14, while select next blocks 52B–52C are coupled to L0 I-cache 16. Each select next block 52 is coupled to instruction select mux 54, which is further coupled to branch scanner 58 and instruction scanner 56. Instruction scanner 56 is coupled to instruction queue 20. Branch scanner 58 is coupled to branch history table 60, return stack 64, and branch select mux 62. Branch select mux 62 is coupled to indirect address cache 66. Branch history table 60 and branch scanner 58 are coupled to forward collapse unit 68, which is coupled to instruction queue 20.

Fetch control unit 50 receives branch prediction information (including target addresses and taken/not taken predictions) from branch scanner 58, branch history table 60, return stack 64, and indirect address cache 66. Responsive to the branch prediction information, fetch control unit 50 generates fetch addresses for L0 I-cache 16 and a fetch or a prefetch address for L1 I-cache 14. In one embodiment, fetch control unit 50 generates two fetch addresses for L0 I-cache 16. The first fetch address is selected as the target address corresponding to the first branch instruction identified by branch scanner 58 (if any). The second fetch address is the sequential address to the fetch address selected in the previous clock cycle (i.e. the fetch address corresponding to the run selected by instruction select mux 54).

L0 I-cache 14 provides the cache lines (and predecode information) corresponding to the two fetch addresses, as well as the cache lines (and predecode information) which are sequential to each of those cache lines, to select next blocks 52B–52C. More particularly, select next block 52B receives the sequential cache line corresponding to the sequential address and the next incremental cache line to the sequential cache line. Select next block 52C receives the target cache line corresponding to the target address as well as the cache line sequential to the target cache line. Additionally, select next blocks 52B–52C receive the offset portion of the corresponding fetch address. Select next blocks 52B–52C each select a run of instruction bytes (and corresponding predecode information) from the received cache lines, beginning with the run section including the offset portion of the corresponding fetch address. Since the offset portion of each fetch address can begin anywhere within the cache line, the selected run may included portions of the fetched cache line and the sequential cache line to the fetched cache line. Hence, both the fetched cache line and the sequential cache line are received by select next blocks 52B–52C.

Similarly, select next block 52A receives a prefetched cache line (and corresponding predecode information) from L1 I-cache 14 and selects an instruction run therefrom. Since one cache line is prefetched from L1 I-cache 14, the run selected therefrom may comprise less than a full run if the offset portion of the prefetch address is near the end of the cache line. It is noted that the fetch cache lines from L0 I-cache 16 may be provided in the same clock cycle as the corresponding addresses are generated by fetch control unit 50, but the prefetch cache line may be a clock cycle delayed due to the larger size and slower access time of L1 I-cache 14. In addition to providing the prefetched cache line to select next block 52A, L1 I-cache 14 provides the prefetched cache line to L0 I-cache 16. If the prefetched cache line is already stored within L0 I-cache 16, L0 I-cache 16 may discard the prefetched cache line. However, if the prefetched cache line is not already stored in L0 I-cache 14, the prefetched cache line is stored into L0 I-cache 16. In this manner, cache lines which may be accessed presently are brought into L0 I-cache 16 for rapid access therefrom. According to one exemplary embodiment, L0 I-cache 16 comprises a fully associative cache structure of eight entries. A fully associative structure may be employed due to the relatively small number of cache lines included in L0 I-cache 16. Other embodiments may employ other organizations (e.g. set associative or direct-mapped).

Fetch control unit 50 selects the instruction run provided by one of select next blocks 52 in response to branch prediction information by controlling instruction select mux 54. As will be explained in more detail below, fetch control unit 50 receives (in the present embodiment) target addresses from branch scanner 58, return stack 64, and indirect address cache 66 early in the clock cycle as well as at least a portion of the opcode byte of the first branch instruction identified by branch scanner 58. Fetch control unit 50 decodes the portion of the opcode byte to select the target address to be fetched from L0 I-cache 16 from the various target address sources and provides the selected target address to L0 I-cache 16. In parallel, the sequential address to the fetch address selected in the previous clock cycle (either the target address or the sequential address from the previous clock cycle, depending upon the branch prediction from the previous clock cycle) is calculated and provided to L0 I-cache 16. Branch prediction information (i.e. taken or not taken) is provided by branch history table 60 late in the clock cycle. If the branch instruction corresponding to the target address fetched from L0 I-cache 16 is predicted taken and the branch target address is backward or forward and outside of the predetermined range for selective canceling, then fetch control unit 50 selects the instruction run provided by select next block 52C. On the other hand, if no branch instruction is detected, the branch instruction is predicted not taken, or the branch target address is forward and within the predetermined range, then the instruction run selected by select next block 52B is selected. The instruction run provided by select next block 52A is selected if a predicted fetch address missed L0 I-cache 16 in a previous clock cycle and was fetched from L1 I-cache 14. Additionally, the instruction run from L1 I-cache 14 is selected if the instruction run was fetched responsive to a branch instruction having a 32 bit displacement or indirect target address generation or an L0 I-cache miss was fetched.

The selected instruction run is provided to instruction scanner 56 and branch scanner 58. Instruction scanner 56 scans the predecode information corresponding to the selected instruction run to identify instructions within the instruction run. More particularly in one embodiment, instruction scanner 56 scans the start bits corresponding to each run section in parallel and identifies up to five instructions within each run section. Pointers to the identified instructions (offsets within the run section) are generated. The pointers, instruction bytes, and addresses (one per run section) are conveyed by instruction scanner 56 to instruction queue 20. If a particular run section includes more than five instructions, the information corresponding to run sections subsequent to the particular run section is invalidated and the particular run section and subsequent run sections are rescanned during the next clock cycle.

Branch scanner 58 scans the instruction run in parallel with instruction scanner 56. Branch scanner 58 scans the start bits and control transfer bits of the instruction run to identify the first two branch instructions within the instruction run. As described above, a branch instruction is identified by the control transfer bit corresponding to the start byte of an instruction (as identified by the start bit) being set. Upon locating the first two branch instructions, branch scanner 58 assumes that the instructions are relative branch instructions and selects the corresponding encoded target addresses from the instruction bytes following the start byte of the branch instruction. For embodiments employing the x86 instruction set, a nine bit target address (the displacement byte as well as the corresponding control transfer bit) is selected, and a 32 bit target address is selected as well. Furthermore, at least a portion of the opcode byte identified by the start and control transfer bits is selected. The target addresses and opcode bytes are routed to fetch control unit 50 for use in selecting a target address for fetching from L0 I-cache 16. The fetch addresses of each branch instruction (determined from the fetch address of the run section including each branch instruction and the position of the branch instruction within the section) are routed to branch history table 60 for selecting a taken/not-taken prediction corresponding to each branch instruction. Furthermore, the fetch addresses corresponding to each branch instruction are routed to branch select mux 62, which is further routed to indirect address cache 66. The target address of each branch instruction is routed to forward collapse unit 68. According to one embodiment, branch scanner 58 is configured to scan each run section in parallel for the first two branch instructions and then to combine the scan results to select the first two branch instructions within the run.

Branch scanner 58 may further be configured to determine if a subroutine call instruction is scanned during a clock cycle. Branch scanner 58 may forward the fetch address of the next instruction following the detected subroutine call instruction to return stack 64 for storage therein.

In one embodiment, if there are more than two branch instructions within a run, the run is scanned again during a subsequent clock cycle to identify the subsequent branch instruction.

The fetch addresses of the identified branch instructions are provided to branch history table 60 to determine a taken/not taken prediction for each instruction. Branch history table 60 comprises a plurality of taken/not-taken predictors corresponding to the previously detected behavior of branch instructions. One of the predictors is selected by maintaining a history of the most recent predictions and exclusive ORing those most recent predictions with a portion of the fetch addresses corresponding to the branch instructions. The least recent (oldest) prediction is exclusive ORed with the most significant bit within the portion of the fetch address, and so forth through the most recent prediction being exclusive ORed with the least significant bit within the portion of the fetch address. Since two predictors are selected per clock cycle, the predictor corresponding to the second branch instruction is dependent upon the prediction of the first branch instruction (for exclusive ORing with the least significant bit of the corresponding fetch address). Branch history table 60 provides the second predictor by selecting both of the predictors which might be selected (i.e. the predictor that would be selected if the first branch instruction is predicted not-taken and the predictor that would be selected if the first branch instruction is predicted taken) and then selecting one of the two predictors based on the actual prediction selected for the first branch instruction.

Branch history table 60 receives information regarding the execution of branch instructions from functional units 32A–32D. The history of recent predictions corresponding to the executed branch instruction as well as the fetch address of the executed branch instruction are provided for selecting a predictor to update, as well as the taken/not taken result of the executed branch instruction. Branch history table 60 selects the corresponding predictor and updates the predictor based on the taken/not taken result. In one embodiment, the branch history table stores a bimodal counter. The bimodal counter is a saturating counter which saturates at a minimum and maximum value (i.e. subsequent decrements of the minimum value and increments of the maximum value cause no change in the counter). Each time a branch instruction is taken, the corresponding counter is incremented and each time a branch instruction is not taken, the corresponding counter is decremented. The most significant bit of the counter indicates the taken/not taken prediction (e.g. taken if set, not taken if clear). In one embodiment, branch history table 60 stores 64K predictors and maintains a history of the 16 most recent predictions. Each clock cycle, the predictions selected during the clock cycle are shifted into the history and the oldest predictions are shifted out of the history.

Return stack 64 is used to store the return addresses corresponding to detected subroutine call instructions. Return stack 64 receives the fetch address of a subroutine call instruction from branch scanner 58. The address of the byte following the call instruction (calculated from the fetch address provided to return stack 64) is placed at the top of return stack 64. Return stack 64 provides the address stored at the top of the return stack to fetch control unit 50 for selection as a target address if a return instruction is detected by branch scanner 58 and fetch control unit 50. In this manner, each return instruction receives as a target address the address corresponding to the most recently detected call instruction. Generally in the x86 instruction set, a call instruction is a control transfer instruction which specifies that the sequential address to the call instruction be placed on the stack defined by the x86 architecture. A return instruction is an instruction which selects the target address from the top of the stack. Generally, call and return instructions are used to enter and exit subroutines within a code sequence (respectively). By placing addresses corresponding to call instructions in return stack 64 and using the address at the top of return stack 64 as the target address of return instructions, the target address of the return instruction may be correctly predicted. In one embodiment, return stack 64 may comprise 16 entries.

Indirect address cache 66 stores target addresses corresponding to previous executions of indirect branch instructions. The fetch address corresponding to an indirect branch instruction and the target address corresponding to execution of the indirect branch instruction are provided by functional units 32A–32D to indirect address cache 66. Indirect address cache 66 stores the target addresses indexed by the corresponding fetch addresses. Indirect address cache 66 receives the fetch address selected by branch select mux 62 (responsive to detection of an indirect branch instruction) and, if the fetch address is a hit in indirect address cache 66, provides the corresponding target address to fetch control unit 50. In one embodiment, indirect address cache 66 may comprise 32 entries.

According to one contemplated embodiment, if indirect address cache 66 detects a miss for a fetch address, indirect address cache 66 may be configured to select a target address to provide from one of the entries. In this manner, a "guess" at a branch target is provided in case an indirect branch instruction is decoded. Fetching from the guess may be performed rather than awaiting the address via execution of the indirect branch instruction. Alternatively, another contemplated embodiment awaits the address provided via execution of the indirect branch instruction.

It is noted that, if an encoded target address is selected, the actual target address may be presented to L0 I-cache 16.

Fetch control unit 50 may be configured to precalculate each of the possible above/below target addresses and select the correct address based on the encoded target address. Alternatively, fetch control unit 50 may record which L0 I-cache storage locations are storing the above and below cache lines, and select the storage locations directly without a tag compare.

Forward collapse unit 68 receives the target addresses and positions within the instruction run of each selected branch instruction as well as the taken/not taken predictions. Forward collapse unit 68 determines which instructions within the run should be cancelled based upon the received predictions. If the first branch instruction is predicted taken and is backward (i.e. the displacement is negative), all instructions subsequent to the first branch instruction are cancelled. If the first branch instruction is predicted taken and is forward but the displacement is small (e.g. within the instruction run), the instructions which are between the first branch instruction and the target address are cancelled. The second branch instruction, if still within the run according to the first branch instruction's prediction, is treated similarly. Cancel indications for the instructions within the run are set to instruction queue 20.

It is noted that, in one embodiment, branch instructions are predicted and target addresses are fetched with a one cycle bubble from the fetching of the branch instructions. The sequential run is fetched during this clock cycle, and the sequential run is discarded upon detecting the predicted taken branch instruction.

Figure 3:
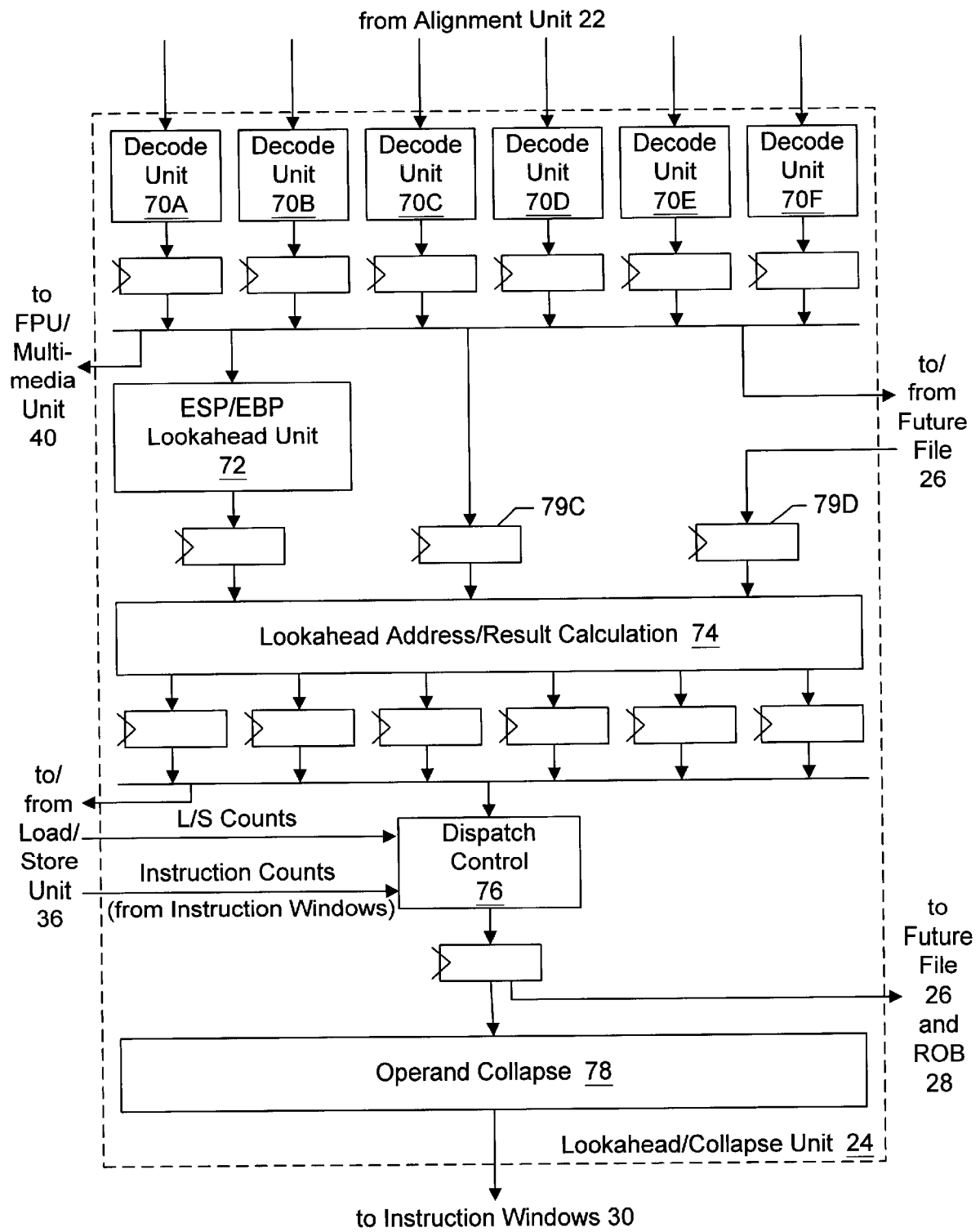
FIG. 3 is a block diagram of one embodiment of a lookahead/collapse unit shown in FIG. 1.

Turning now to FIG. 3, a block diagram of one embodiment of lookahead/collapse unit 24 is shown. Other embodiments are possible and contemplated. As shown in FIG. 3, lookahead/collapse unit 24 includes a plurality of decode units 70A–70F, an ESP/EBP lookahead unit 72, a lookahead address/result calculation unit 74, a dispatch control unit 76, and an operand collapse unit 78. Decode units 70A–70F are coupled to receive instructions from alignment unit 22. Decode units 70A–70F are coupled to provide decoded instructions to FPU/multimedia unit 40, ESP/EBP lookahead unit 72, future file 26, and lookahead address/result calculation unit 74. ESP/EBP lookahead unit 72 is coupled to lookahead address/result calculation unit 74, as is future file 26. Lookahead address/result calculation unit 74 is further coupled load/store unit 36 and dispatch control unit 76. Dispatch unit 76 is further coupled to operand collapse unit 78, future file 26, load/store unit 36, and reorder buffer 28. Operand collapse unit 78 is coupled to instruction windows 30.

Each decode unit 70A–70F forms an issue position to which alignment unit 22 aligns an instruction. While not indicated specifically throughout FIG. 3 for simplicity the drawing, a particular instruction remains within its issue position as the instruction moves through lookahead/collapse unit 24 and is routed to one of instruction windows 30A–30B if not completed within lookahead/collapse unit 24.

Decode units 70A–70F route FPU/multimedia instructions to FPU/multimedia unit 40. However, if the FPU/multimedia instructions include memory operands, memory operations are also dispatched to load/store unit 36 in response to the instruction through lookahead address/result calculation unit 74. Additionally, if the address for the memory operations cannot be generated by lookahead address/result calculation unit 74, an address generation operation is dispatched to one of address generation units 34A–34D via instruction windows 30A–30B. Still further, entries within reorder buffer 28 are allocated to the FPU/multimedia instructions for maintenance of program order. Generally, entries within reorder buffer 28 are allocated from decode units 70A–70F for each instruction received therein.

Each of decode units 70A–70F may be further configured to determine: (i) whether or not the instruction uses the ESP or EBP registers as a source operand; and (ii) whether not the instruction modifies the ESP/EBP registers (i.e. has the ESP or EBP registers as a destination operand). Indications of these determinations are provided by decode units 70A–70F to ESP/EBP lookahead unit 72. ESP/EBP lookahead unit 72 generates lookahead information for each instruction which uses the ESP or EBP registers as a source operand. The lookahead information may include a constant to be added to the current lookahead value of the corresponding register and an indication of a dependency upon an instruction in a prior issue position. In one embodiment, ESP/EBP lookahead unit 72 is configured to provide lookahead information as long as the set of concurrently decoded instructions provided by decode units 70A–70F do not include more than: (i) two push operations (which decrement the ESP register by a constant value); (ii) two pop operations (which increment ESP register by a constant value); (iii) one move to ESP register; (iv) one arithmetic/logical instruction having the ESP as a destination; or (v) three instructions which update ESP. If one of these restrictions is exceeded, ESP/EBP lookahead unit 72 is configured to stall instructions beyond those which do not exceed restrictions until the succeeding clock cycle (a "split line" case). For those instructions preceded, in the same clock cycle but in earlier issue positions, by instructions which increment or decrement the ESP register, ESP/EBP lookahead unit 72 generates a constant indicating the combined total modification to the ESP register of the preceding instructions. For those instructions preceded by a move or arithmetic operation upon the ESP or EBP registers, ESP/EBP lookahead unit 72 generates a value identifying the issue position containing the move or arithmetic instruction.

The lookahead values may be used by lookahead address/result calculation unit 74 to generate either a lookahead address corresponding to the instruction within the issue position (thereby inhibiting an address generation operation which would otherwise be performed by one of address generation units 34A–34D) or a lookahead result corresponding to the instruction (thereby providing lookahead state to future file 26 earlier in the pipeline). Performance may be increased by removing address generation operations and/or providing lookahead state prior to functional units 32A–32D and address generation units 34A–34 D. Many x86 code sequences include a large number of relatively simple operations such as moves of values from a source to destination without arithmetic/logical operation or simple arithmetic operations such as add/subtract by small constant or increment/decrement of a register operand. Accordingly, functional units 32A–32D may typically execute the more complex arithmetic/logical operations and branch instructions and address generation units 34A–34D may typically perform the more complex address generations. Instruction throughput may thereby be increased.

Decode units 70A–70F may be still further configured to identify immediate data fields from the instructions decoded therein. The immediate data is routed to lookahead address/result calculation unit 74 by decode units 70A–70F. Additionally, decode unit 70A–70F are configured to identify register operands used by the instructions and to route register operand requests to future file 26. Future file 26 returns corresponding speculative register values or result queue tags for each register operand. Decode units 70 further provide dependency checking between the line of instructions to ensure that an instruction which uses a result of an instruction within a different issue position receives a tag corresponding to that issue position.

Lookahead address/result calculation unit 74 receives the lookahead values from ESP/EBP lookahead units 72, the immediate data from decode units 70A–70F, and the speculative register values or result queue tags from future file 26. Lookahead address/result calculation unit 74 attempts to generate either a lookahead address corresponding to a memory operand of the instruction, or a lookahead result if the instruction does not include a memory operand. For example, simple move operations can be completed (with respect to functional units 32 and address generation units 34) if an address generation can be performed by lookahead address/result calculation unit 74. In one embodiment, lookahead address/result calculation unit 74 is configured to compute addresses using displacement only, register plus displacement, ESP/EBP plus displacement, and scale-index-base addressing mode except for index or base registers being ESP/EBP. Load/store unit 36 performs the memory operation and returns the memory operation results via result buses 48. Even if no address is generated for a memory operation by lookahead address/result calculation unit 74, lookahead address/result calculation unit 74 indicates the memory operation and corresponding result queue tag to load/store unit 36 to allocate storage within load/store unit 36 for the memory operation.

Simple arithmetic operations which increment or decrement a source operand, add/subtract a small immediate value to a source operand, or add/subtract two register source operands may also be completed via lookahead address/result calculation unit 74 if the source operands are available from future file 26 (i.e. a speculative register value is received instead of a result queue tag). Instructions completed by lookahead address/result calculation units 74 are indicated as completed and are allocated entries in reorder buffer 28 but are not dispatched to instruction windows 30. Lookahead address/result calculation unit 74 may comprise, for example, an adder for each issue position along with corresponding control logic for selecting among the lookahead values, immediate data, and speculative register values. It is noted that simple arithmetic operations may still be forwarded to instruction windows 30 for generation of condition flags, according to the present embodiment. However, generating the functional result in lookahead address/result calculation unit 74 provides the lookahead state early, allowing subsequent address generations/instructions to be performed early as well.

Lookahead address/result calculation unit 74 may be configured to keep separate lookahead copies of the ESP/EBP registers in addition to the future file copies. However, if updates to the ESP/EBP are detected which cannot be calculated by lookahead address/result calculation unit 74, subsequent instructions may be stalled until a new lookahead copy of the ESP/EBP can be provided from future file 26 (after execution of the instruction which updates ESP/EBP in the undeterminable manner).

Dispatch control unit 76 determines whether or not a group of instructions are dispatched to provide pipeline flow control. Dispatch control unit 76 receives instruction counts from instruction windows 30 and load/store counts from load/store unit 36 and, assuming the maximum possible number of instructions are in flight in pipeline stages between dispatch control units 76 and instruction windows 30 and load/store unit 36, determines whether or not space will be available for storing the instructions to be dispatched within instruction windows 30 and/or load/store unit 36 when the instructions arrive therein. If dispatch control unit 76 determines that insufficient space will be available in load/store unit 36 and either instruction window 30, dispatch is stalled until the instruction counts received by dispatch control unit 76 decrease to a sufficiently low value.

Upon releasing instructions for dispatch through dispatch control unit 76, future file 26 and reorder buffer 28 are updated with speculatively generated lookahead results. In one embodiment, the number of non-ESP/EBP updates supported may be limited to, for example, two in order to limit the number of ports on future file 26. Furthermore, operand collapse unit 78 collapses speculatively generated lookahead results into subsequent, concurrently decoded instructions which depend upon those results as indicated by the previously determined intraline dependencies. In this manner, the dependent instructions receive the speculatively generated lookahead results since these results will not subsequently be forwarded from functional units 32A–32D. Those instructions not completed by lookahead address/result calculation unit 74 are then transmitted to one of instruction windows 30A–30B based upon the issue position to which those instructions were aligned by alignment unit 22.

It is noted that certain embodiments of processor 10 may employ a microcode unit (not shown) for executing complex instructions by dispatching a plurality of simpler instructions referred to as a microcode routine. Decode units 70A–70F may be configured to detect which instructions are microcode instructions and to route the microcode instructions to the microcode unit. For example, the absence of a directly decoded instruction output from a decode unit 70 which received a valid instruction may be an indication to the microcode unit to begin execution for the corresponding valid instruction. It is further noted that various storage devices are shown in FIGS. 2 and 3 (e.g. devices 79A, 79B, and similar devices in FIG. 2 and devices 79C, 79D and similar devices in FIG. 3). The storage devices represent latches, registers, flip-flops and the like which may be used to separate pipeline stages. However, the particular pipeline stages shown in FIGS. 2 and 3 are but one embodiment of suitable pipeline stages for one embodiment of processor 10. Other pipeline stages may be employed in other embodiments.

It is noted that, while the x86 instruction set and architecture has been used as an example above and may be used as an example below, any instruction set and architecture may be used. Additionally, displacements may be any desirable size (in addition to the 8 bit and 32 bit sizes used as examples herein). Furthermore, while cache line fetching may be described herein, it is noted that cache lines may be sectors, and sectors may be fetched, if desirable based upon cache line size and the number of bytes desired to be fetched.

Figure 4:
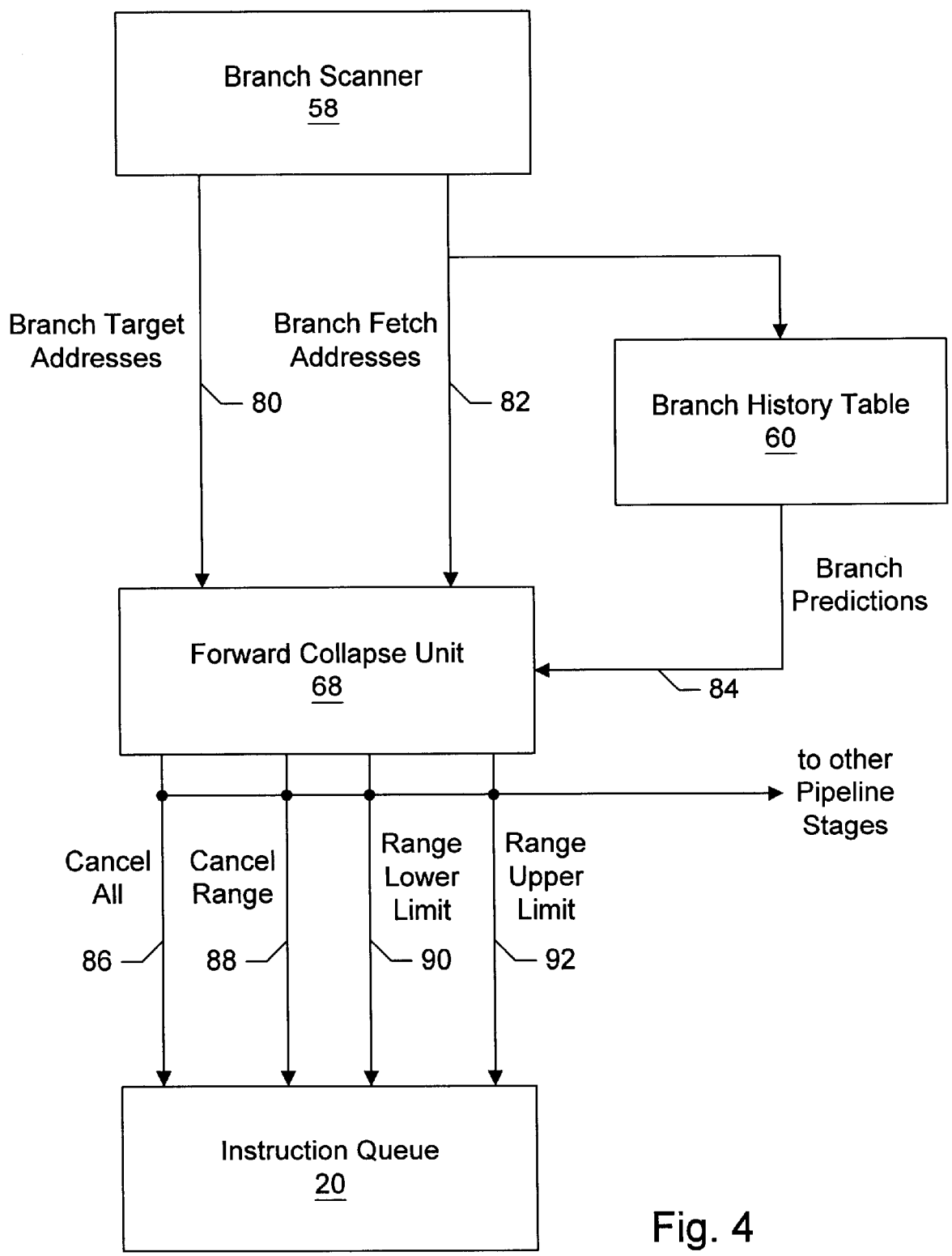
FIG. 4 is a block diagram of one embodiment of a branch scanner, a branch history table, a forward collapse unit, and an instruction queue.

Turning now to FIG. 4, a block diagram of branch scanner 58, branch history table 60, forward collapse unit 68, and instruction queue 20 is shown to highlight interconnection therebetween according to one particular implementation of processor 10. Other embodiments are possible and contemplated, including alternative or additional interconnection as desired. In the embodiment of FIG. 4, branch scanner 58 is coupled to a branch target address bus 80 and a branch fetch address bus 82. Branch target address bus 80 is further coupled to forward collapse unit 68. Similarly, branch fetch address bus 82 is further coupled to forward collapse unit 68, and is also coupled to branch history table 60. Branch history table 60 is coupled to a branch predictions bus 84 which is further coupled to forward collapse unit 68. Forward collapse unit 68 is still further coupled to a cancel all line 86, a cancel range line 88, a range lower limit bus 90, and a range upper limit bus 92, each of which is further coupled to instruction queue 20. It is noted that pipeline storage devices similar to devices 79 shown in FIGS. 2–3 have been omitted for simplicity in the drawing. Any suitable pipeline may be employed.

Generally speaking, forward collapse unit 68 is used to select instructions to be cancelled based upon the branch predictions corresponding to branch instructions identified within the run. Forward collapse unit 68 receives the branch target addresses corresponding to the branch instructions detected by branch scanner 58 as well as the branch fetch addresses. Additionally, forward collapse unit 68 receives the corresponding branch predictions from branch history table 60. If a branch instruction is predicted taken, forward collapse unit 68 determines which instructions to cancel. More particularly, for forward branch target addresses, forward collapse unit 68 determines if the branch target address identifies a subsequent instruction within a predetermined range of the branch instruction or whether the branch target address identifies an instruction outside of the range (the instruction identified by the branch target address is the instruction stored at the branch target address and is referred to as the "target instruction"). If the target address is within the range, prefetch control unit 50 is selecting the sequential fetch even though the branch instruction is predicted taken (as described above). Accordingly, the target instruction and subsequent instructions within the run are to be retained so that the predicted instruction sequence is executed by processor 10. Furthermore, the instructions between the branch instruction and the target instruction are to be cancelled, thereby forming the predicted instruction sequence.

If forward collapse unit 68 determines that a predicted taken branch instruction has a forward target address within the range, forward collapse unit 68 signals instruction queue 20 of a range of addresses for which instructions are to be cancelled. In the present embodiment, forward collapse unit 68 activates a cancel range signal on cancel range line 88, and provides the addresses of the lower and upper limit of the range upon the range lower limit bus 90 and range upper limit bus 92, respectively. Instruction queue 20, responsive to the activated cancel range signal, invalidates any instructions stored therein which lie between the lower and upper limits. An instruction lies between the lower and upper limits if the address of the instruction is numerically greater than the lower limit and is numerically less than the upper limit. Since the instructions to be cancelled lie between the branch instruction and the target instruction for a forward branch target address, the range lower limit may be the fetch address of the predicted taken branch instruction and the range upper limit may be the branch target address.

For branch instructions having backward branch target addresses (i.e. be branch target addresses numerically less than the corresponding branch fetch address), each of the instructions subsequent to the branch instruction is not within the predicted instruction sequence. Accordingly, upon detecting a branch instruction having a backward target address, forward collapse unit 68 activates a cancel all signal upon cancel all line 86 and provides the branch fetch address as the range lower limit. Responsive to the activated cancel all signal, instruction queue 20 invalidates each instruction stored at an address greater than the range lower limit address.

Forward collapse unit 68 may handle branch instructions having forward branch target addresses which identify a target instruction outside of the predetermined range in a manner similar to handling branch instructions having backward branch target addresses. In these cases, forward collapse unit 68 activates the cancel all signal and provides the branch fetch address as the range lower limit address.

While forward collapse unit 68 may be employed in embodiments in which one branch instruction is predicted per clock cycle, the present embodiment attempts to predict up to two branch instructions per clock cycle. Forward collapse unit 68 receives the branch target address and branch fetch address for each detected branch instruction. In the present embodiment, forward collapse unit 68 processes the first identified branch instruction (i.e. the instruction which is encountered first in program order within the run) prior to processing the second identified branch instruction. If the second identified branch instruction is still within the run subsequent to processing the first identified branch instruction, the second identified branch instruction is processed subsequently.

Generally, forward collapse unit 68 may be configured to determine if a particular branch instruction has a forward branch target address by comparing the branch fetch address to the corresponding branch target address. If the branch target address is greater than the branch fetch address, then the branch target address is forward. In the present embodiment, forward collapse unit 68 may receive a branch target address which is encoded with the cache line offset of the branch target address as well as an indication of the number of cache lines above or below the cache line storing the branch instruction (as described above). Accordingly, forward collapse unit 68 may determine that the branch target address is a forward branch target address by determining that the branch target address is one or two cache lines above or is within the same cache line and the offset portion of the branch target addresses greater than the branch fetch address. Other embodiments may use the full branch target address and branch fetch address to determine if the branch target address is a forward branch target address, or may use a suitable portion of the addresses.

It is noted that forward collapse unit 68 may detect whether or not the forward branch target address is within the predetermined range by comparing the branch fetch address and the branch target address. Generally, the size of the predetermined range may vary from embodiment to embodiment. However, the size of the predetermined range may be selected based upon the amount of instruction bytes fetched prior to the prediction of a forward branch instruction. In other words, since sequential fetching is chosen in the absence of a predicted taken branch, instructions sequential to a predicted taken branch instruction are fetched until the branch instruction is predicted and the fetch mechanism would be able to fetch the branch target address. The size of the predetermined range may be based upon the amount of sequential instructions which may be fetched. If a forward branch target address outside of the predetermined range is detected, than all of the sequential instructions which have been fetched prior to predicting the branch instruction may be prior to the target instruction identified by the forward branch target address. On the other hand, if a forward branch target address within the predetermined range is detected, than the target instruction and one or more subsequent instructions may have already been fetched. In one exemplary embodiment, the predetermined range may be 64 bytes from the branch fetch address. In another embodiment, the predetermined range could be selected such that the target instruction is within the run with the corresponding branch instruction. It is noted that, depending upon the size of the predetermined range, the cancellation indications provided by forward collapse unit 68 may be provided to other pipeline stages besides instruction queue 20. Alternatively, instruction queue 20 may retain cancellation indications and continue canceling instructions until the target instruction is received.

Embodiments of forward collapse unit 68 which handle multiple branch predictions within a run may further determine whether or not the second identified branch instruction is still within the run after processing the first identified branch instruction by comparing the branch target address of the first identified branch instruction to the branch fetch address of the second identified branch instruction. If the branch target address of the first identified branch instruction is greater than the branch fetch address of the second identified branch instruction and the first identified branch instruction is predicted taken, then the second branch instruction is no longer within the run and is not processed. Otherwise, the second branch instruction is processed. It is noted that processing of the second branch instruction may be initiated in parallel with processing of the first branch instruction, and the cancellations corresponding to the second branch instruction (if any) may be broadcast is inhibited based on whether the second branch instruction is still within the run after cancellations (if any) due to the first branch instruction.

It is noted that forward collapse unit 68 may be integrated into instruction queue 20, if desired. It is also noted that, as an alternative to comparing addresses, embodiments of forward collapse unit 68 and processor 10 are contemplated in which processor 10 assigns sequence numbers to the instructions within a run (e.g. via instruction scanner 56). Forward collapse unit 68 may be provided with the sequence numbers as well as an indication of the sequence number of the branch instruction and the corresponding target instruction. Cancellation of instructions may be performed on the basis of the sequence numbers instead of the addresses.

It is noted that cancellation indications may additionally be routed to alignment unit 22 and lookahead/collapse unit 24 to cause cancellation of instructions which may have been dispatched from instruction queue 20 prior to cancellation. It is further noted that, although the present discussion refers to transmitting only a lower limit with cancel all indications, forward collapse unit 68 may be configured to transmit the branch fetch address as the lower limit and the branch target address as the upper limit, with the cancel all and cancel range signals validating the upper and lower limits.

Figure 5:
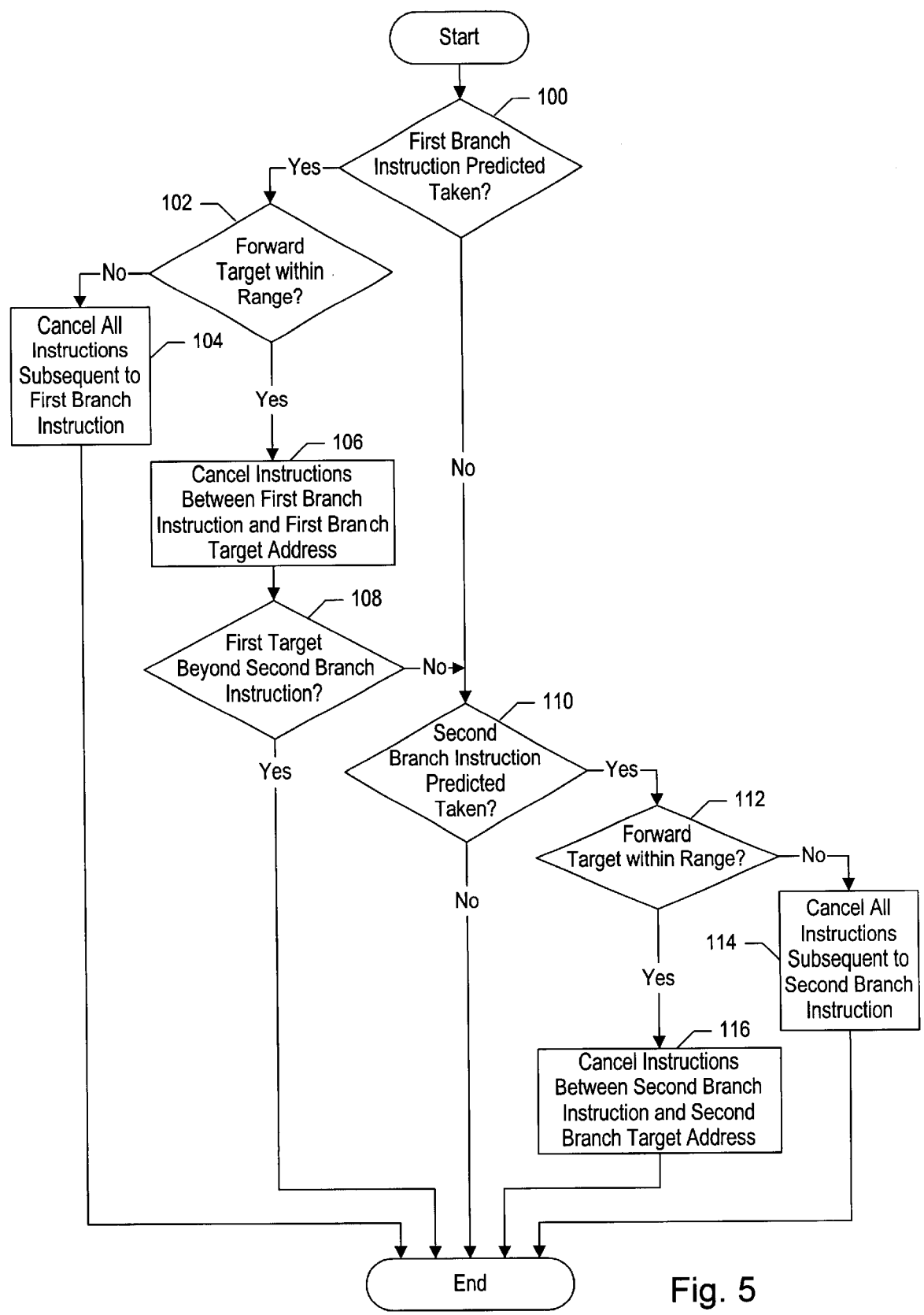
FIG. 5 is a flowchart illustrating operation of one embodiment of the forward collapse unit shown in FIGS. 2 and 4.

Turning next to FIG. 5, a flowchart illustrating operation of one embodiment of forward collapse unit 68 is shown. Other embodiments are possible and contemplated. The steps shown in FIG. 5 are shown in a particular order for ease of understanding. However, any suitable order may be used. Furthermore, steps may be performed in parallel as desired.

Upon receiving an indication of at least a first branch instruction from branch scanner 58 and the corresponding branch prediction from branch history table 60, forward collapse unit 68 determines whether or not the first branch instruction is predicted taken (decision block 100). If the first branch instruction is predicted taken, forward collapse unit 68 determines if the first branch instruction includes a forward branch target address within the predetermined range (decision block 102). If a forward branch target address within the range is not detected for the first branch instruction, forward collapse unit 68 signals instruction queue 20 to cancel all instructions subsequent to the first branch instruction within the run (step 104). On the other hand, if a forward branch target address within the range is detected, forward collapse unit 68 signals instruction queue 20 to cancel instructions between the first branch instruction and the instruction located at the first branch target address (step 106).

If either the first branch instruction is predicted not taken or the first branch target address indicates an instruction within the run which is not subsequent to the second branch instruction (decision block 108), forward collapse unit 68 determines if the second branch instruction (if any) is predicted taken (decision block 110). If the second branch instruction is not predicted taken, additional cancellations are not needed. If a second branch instruction is predicted taken, forward collapse unit 68 determines if the second branch target address is a forward branch target address within the predetermined range (decision block 112). If the second branch target address is a forward target address within the predetermined range, forward collapse unit 68 signals instruction queue 20 to cancel all instructions subsequent to the second branch instruction (step 114). On the other hand, if the second branch target address is a forward branch target address within the range, forward collapse unit 68 signals instruction queue 20 to cancel instructions between the second branch instruction and the instruction indicated by the second branch target address (step 116).

It is noted that, in the embodiment shown in FIG. 4, forward collapse unit 68 is configured transmit one cancellation indication per clock cycle. Accordingly, the steps shown in FIG. 5 may be performed over a pair of clock cycles. For example, forward collapse unit 68 may determine cancellation signalling for both the first and second branch instruction upon receiving the branch target addresses, branch fetch addresses, and branch predictions and convey the cancellations during consecutive clock cycles if two cancellations are detected. Alternatively, examination and cancellation based on the first branch instruction may be performed in one clock cycle and examination cancellation based second branch instruction may occur in any subsequent clock cycle. In yet another alternative, cancellation indications for each branch instruction which may be detected within a run may be conveyed concurrently.

Figure 6:
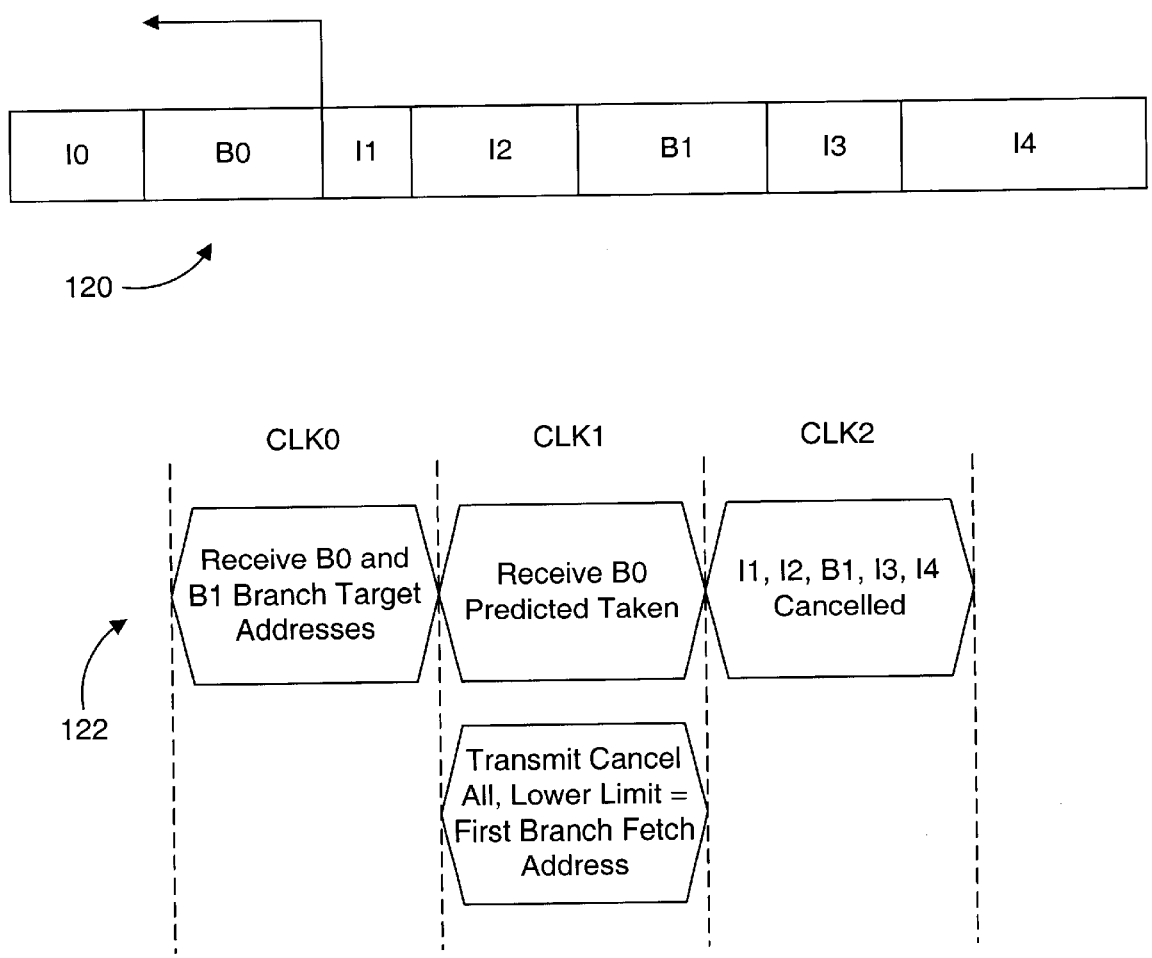
FIG. 6 is an example of an instruction run including a branch instruction have a backward branch target address.

Turning next to FIG. 6, an exemplary instruction run 120 is shown including a first branch instruction (B0) having a backward branch target address. Instructions other than branch instructions within instruction run 120 are indicated with an "I" followed by a number, while branch instructions are indicated by a "B" followed by a number. In other words, run 120 includes branch instructions B0 and B1 as well as non-branch instructions I0, I1, I2, I3, and I4. Program order of the instructions is from left to right as illustrated in FIG. 6. In other words, instruction I0 is foremost of the instructions within run 120 and hence is stored at the numerically lowest address of the instructions within run 120. Subsequent instructions follow in the order listed and hence are stored at increasingly (numerically) larger addresses. The arrow connected to branch instruction B0 and pointing to the left indicates that branch instruction B0 has a backward branch target address.

A timing diagram 122 is also shown in FIG. 6, illustrating operation of one embodiment of forward collapse unit 68 in response to instruction run 120. Clock cycles within the timing diagram are delimited by vertical dashed lines. During clock cycle CLK0, forward collapse unit 68 receives the branch target addresses (and branch fetch addresses) corresponding to branch instructions B0 and B1 from branch scanner 58. During clock cycle CLK 1, the corresponding branch prediction for branch instruction B0 is received. The branch prediction corresponding to branch instruction B1 may be received during clock cycle CLK1 as well, but is a don't care in this case because the branch target address corresponding to branch instruction B0 is a backward branch target address and branch instruction B0 is predicted taken.

Responsive to the prediction of branch instruction B0 as taken and the branch target address corresponding to branch instruction B0 being a backward branch target address, forward collapse unit 68 transmits a cancel all signal to instruction queue 20 and provides the fetch address corresponding to the branch instruction B0 as the range lower limit during clock cycle CLK1. As a result, as shown in clock cycle CLK2, the instructions subsequent to branch instruction B0 have been cancelled (i.e. instructions I1, I2, B1, I3, and I4).

Figure 7:
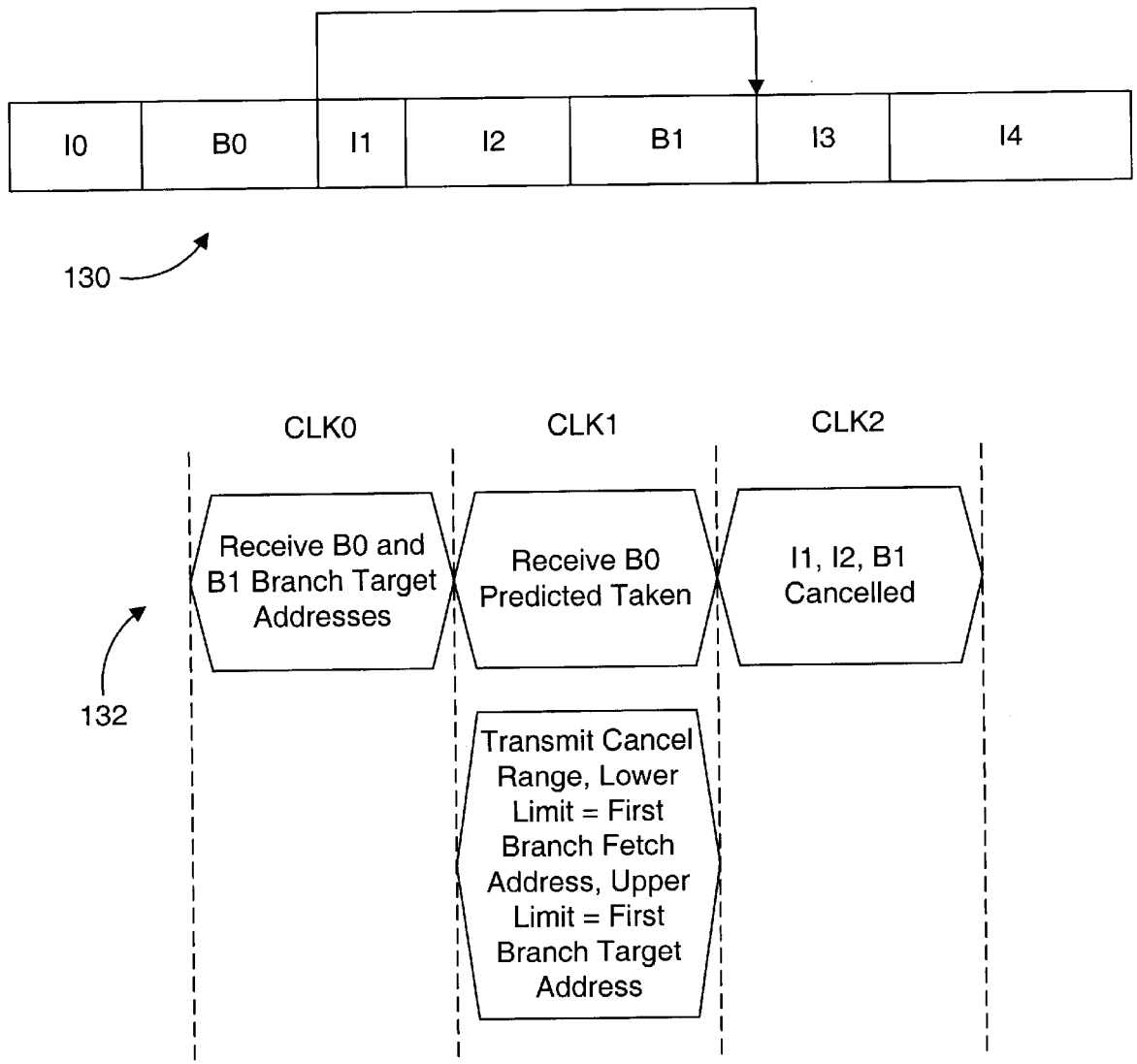
FIG. 7 is an example of an instruction run including a branch instruction have a forward branch target address.

Turning next to FIG. 7, an exemplary instruction run 130 is shown including a first branch instruction (B0) having a forward branch target address. Instructions other than branch instructions within instruction run 130 are indicated with an "I" followed by a number, while branch instructions are indicated by a "B" followed by a number. In other words, run 130 includes branch instructions B0 and B1 as well as non-branch instructions I0, I1, I2, I3, and I4. Program order of the instructions is from left to right as illustrated in FIG. 7. In other words, instruction I0 is foremost of the instructions within run 130 and hence is stored at the numerically lowest address of the instructions within run 130. Subsequent instructions follow in the order listed and hence are stored at increasingly (numerically) larger addresses. The arrow connected to branch instruction B0 and pointing to the right indicates that branch instruction B0 has a forward branch target address. Additionally, the target instruction identified by the forward branch target address is I3 within run 130.

A timing diagram 132 is also shown in FIG. 7, illustrating operation of one embodiment of forward collapse unit 68 in response to instruction run 130. Clock cycles within the timing diagram are delimited by vertical dashed lines. During clock cycle CLK0, forward collapse unit 68 receives the branch target addresses (and branch fetch addresses) corresponding to branch instructions B0 and B1 from branch scanner 58. During clock cycle CLK 1, the corresponding branch prediction for branch instruction B0 is received. The branch prediction corresponding to branch instruction B1 may be received during clock cycle CLK1 as well, but is a don't care in this case because the branch target address corresponding to branch instruction B0 is a forward branch target address, is predicted taken, and indicates a target instruction which is beyond branch instruction B1 within run 130.

Responsive to the prediction of branch instruction B0 as taken and the branch target address corresponding to branch instruction B0 being a forward branch target address, forward collapse unit 68 transmits a cancel range signal to instruction queue 20, provides the fetch address corresponding to branch instruction B0 as the range lower limit, and provides the forward branch target address specified by branch instruction B0 as the range upper limit during clock cycle CLK1. As a result, as shown in clock cycle CLK2, the instructions subsequent to branch instruction B0 and prior to the target instruction (I3) have been cancelled (i.e. instructions I1, I2, and B1). Furthermore, the target instruction and subsequent instructions (I3 and I4) have been retained.

Figure 8:
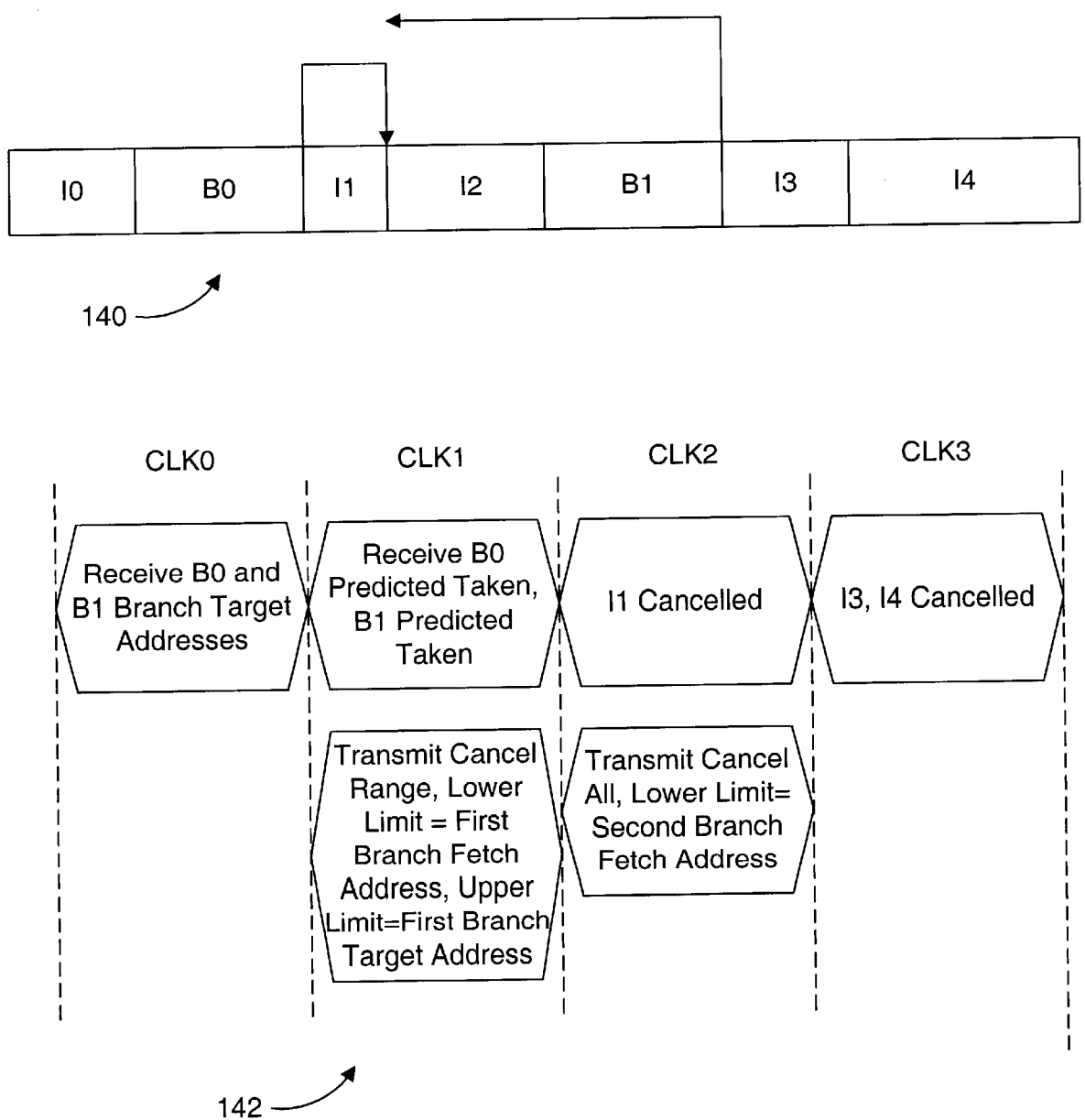
FIG. 8 is an example of an instruction run including a branch instruction have a forward branch target address and a second branch instruction have a backward branch target address.

Turning next to FIG. 8, an exemplary instruction run 140 is shown including a first branch instruction (B0) having a forward branch target address and a second branch instruction (B1) having a backward branch target address. Instructions other than branch instructions within instruction run 140 are indicated with an "I" followed by a number, while branch instructions are indicated by a "B" followed by a number. In other words, run 140 includes branch instructions B0 and B1 as well as non-branch instructions I0, I1, I2, I3, and I4. Program order of the instructions is from left to right as illustrated in FIG. 8. In other words, instruction I0 is foremost of the instructions within run 140 and hence is stored at the numerically lowest address of the instructions within run 140. Subsequent instructions follow in the order listed and hence are stored at increasingly (numerically) larger addresses. The arrow connected to branch instruction B0 and pointing to the right indicates that branch instruction B0 has a forward branch target address. Additionally, the target instruction identified by the forward branch target address is I2 within run 140. The arrow connected to branch instruction B1 and pointing to the left indicates that branch instruction B1 has a backward branch target address.

A timing diagram 142 is also shown in FIG. 8, illustrating operation of one embodiment of forward collapse unit 68 in response to instruction run 140. Clock cycles within the timing diagram are delimited by vertical dashed lines. During clock cycle CLK0, forward collapse unit 68 receives the branch target addresses (and branch fetch addresses) corresponding to branch instructions B0 and B1 from branch scanner 58. During clock cycle CLK1, the corresponding branch predictions for branch instructions B0 and B1 are received.

Responsive to the prediction of branch instruction B0 as taken and the branch target address corresponding to branch instruction B0 being a forward branch target address, forward collapse unit 68 transmits a cancel range signal to instruction queue 20, provides the fetch address corresponding to branch instruction B0 as the range lower limit, and provides the forward branch target address specified by branch instruction B0 as the range upper limit during clock cycle CLK1. As a result, as shown in clock cycle CLK2, the instructions subsequent to branch instruction B0 and prior to the target instruction (I2) have been cancelled (i.e. instruction I1). Furthermore, the target instruction and subsequent instructions (I2, B1, I3 and I4) have been retained.

Responsive to branch instruction B1 being retained after instruction cancellation corresponding to branch instruction B0 being performed, the prediction of branch instruction B1 as taken, and the branch target address corresponding to branch instruction B1 being a backward branch target address, forward collapse unit 68 transmits a cancel all signal to instruction queue 20, and provides the fetch address corresponding to branch instruction B1 as the range lower limit during clock cycle CLK2. As a result, as shown in clock cycle CLK3, the instructions subsequent to branch instruction B1 have been cancelled (i.e. instructions I3 and I4).

Figure 9:
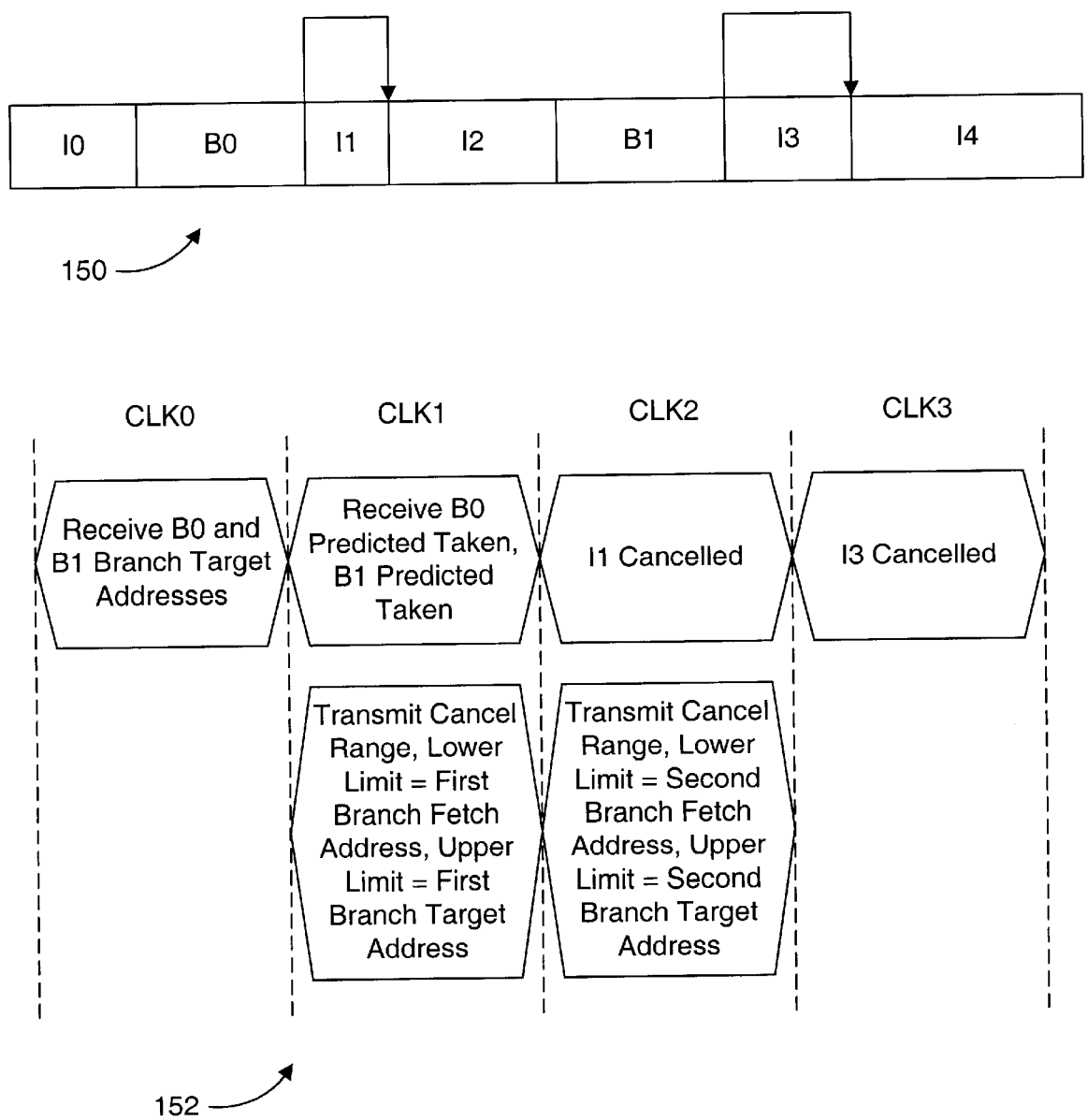
FIG. 9 is an example of an instruction run including a branch instruction have a forward branch target address and a second branch instruction have in forward branch target address.

Turning next to FIG. 9, an exemplary instruction run 150 is shown including a first branch instruction (B0) having a forward branch target address and a second branch instruction (B1) having a forward branch target address. Instructions other than branch instructions within instruction run 150 are indicated with an "I" followed by a number, while branch instructions are indicated by a "B" followed by a number. In other words, run 150 includes branch instructions B0 and B1 as well as non-branch instructions I0, I1, I2, I3, and I4. Program order of the instructions is from left to right as illustrated in FIG. 9. In other words, instruction I0 is foremost of the instructions within run 150 and hence is stored at the numerically lowest address of the instructions within run 150. Subsequent instructions follow in the order listed and hence are stored at increasingly (numerically) larger addresses. The arrow connected to branch instruction B0 and pointing to the right indicates that branch instruction B0 has a forward branch target address. Additionally, the target instruction identified by the forward branch target address is I2 within run 150. The arrow connected to branch instruction B1 and pointing to the right indicates that branch instruction B1 has a forward branch target address. Additionally, the target instruction identified by the forward branch target address is I4 within run 150.

A timing diagram 152 is also shown in FIG. 9, illustrating operation of one embodiment of forward collapse unit 68 in response to instruction run 150. Clock cycles within the timing diagram are delimited by vertical dashed lines. During clock cycle CLK0, forward collapse unit 68 receives the branch target addresses (and branch fetch addresses) corresponding to branch instructions B0 and B1 from branch scanner 58. During clock cycle CLK1, the corresponding branch predictions for branch instructions B0 and B1 are received.

Responsive to the prediction of branch instruction B0 as taken and the branch target address corresponding to branch instruction B0 being a forward branch target address, forward collapse unit 68 transmits a cancel range signal to instruction queue 20, provides the fetch address corresponding to branch instruction B0 as the range lower limit, and provides the forward branch target address specified by branch instruction B0 as the range upper limit during clock cycle CLK1. As a result, as shown in clock cycle CLK2, the instructions subsequent to branch instruction B0 and prior to the target instruction (I2) have been cancelled (i.e. instruction I1). Furthermore, the target instruction and subsequent instructions (I2, B1, I3 and I4) have been retained.

Responsive to branch instruction B1 being retained after instruction cancellation corresponding to branch instruction B0 being performed, the prediction of branch instruction B1 as taken, and the branch target address corresponding to branch instruction B1 being a forward branch target address, forward collapse unit 68 transmits a cancel range signal to instruction queue 20, provides the fetch address corresponding to branch instruction B1 as the range lower limit, and provides the forward branch target address corresponding to branch instruction B1 as the range upper limit during clock cycle CLK2. As a result, as shown in clock cycle CLK3, the instructions subsequent to branch instruction B1 and prior to the target instruction (I4) have been cancelled (i.e. instructions I3). Furthermore, the target instruction (I4) has been retained.

Figure 10:
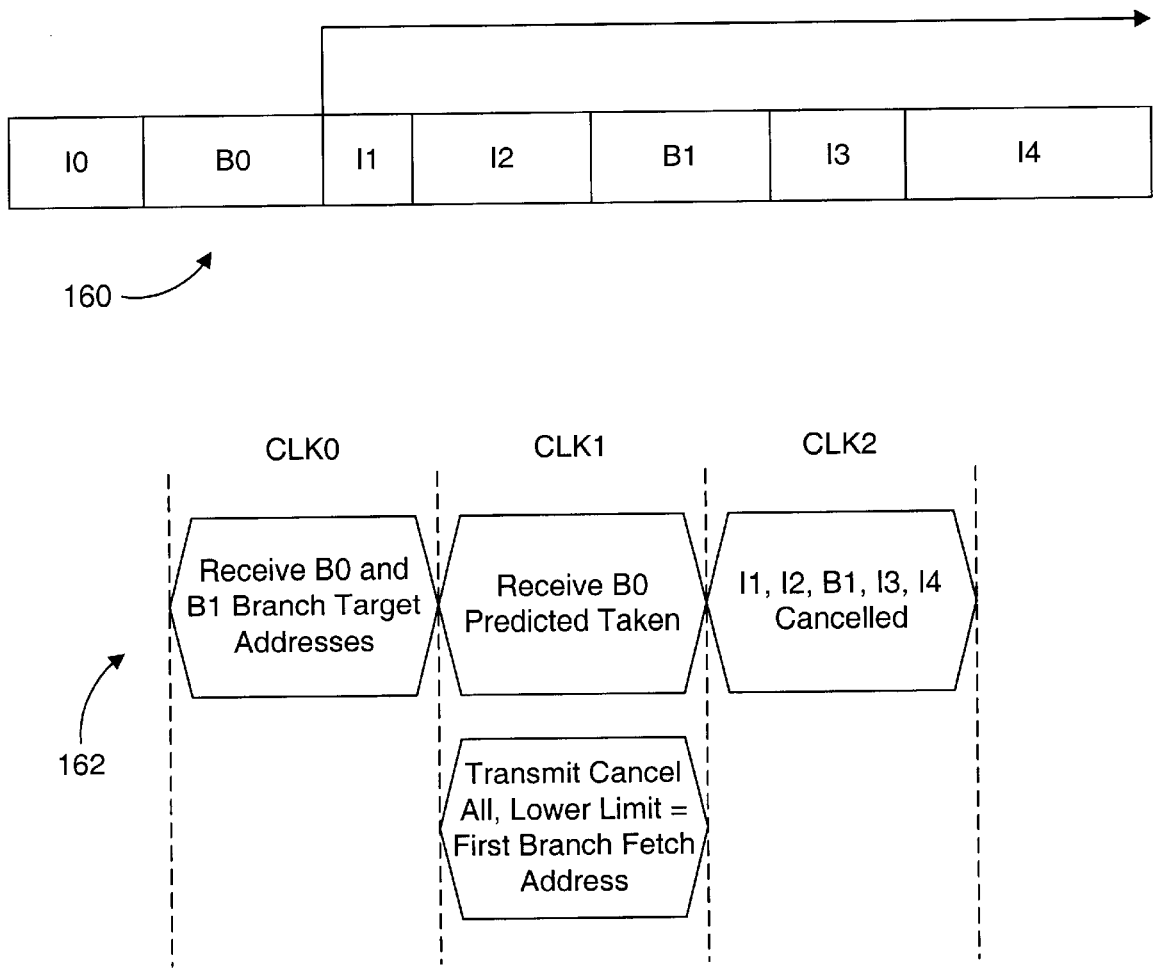
FIG. 10 is an example of an instruction run including a branch instruction have a forward branch target address which is outside of the run.

Turning next to FIG. 10, an exemplary instruction run 160 is shown including a first branch instruction (B0) having a forward branch target address outside of run 160 and more particularly outside of the predetermined range. Instructions other than branch instructions within instruction run 160 are indicated with an "I" followed by a number, while branch instructions are indicated by a "B" followed by a number. In other words, run 160 includes branch instructions B0 and B1 as well as non-branch instructions I0, I1, I2, I3, and I4. Program order of the instructions is from left to right as illustrated in FIG. 10. In other words, instruction I0 is foremost of the instructions within run 160 and hence is stored at the numerically lowest address of the instructions within run 160. Subsequent instructions follow in the order listed and hence are stored at increasingly (numerically) larger addresses. The arrow connected to branch instruction B0 and pointing to the right indicates that branch instruction B0 has a forward branch target address.

A timing diagram 162 is also shown in FIG. 10, illustrating operation of one embodiment of forward collapse unit 68 in response to instruction run 160. Clock cycles within the timing diagram are delimited by vertical dashed lines. During clock cycle CLK0, forward collapse unit 68 receives the branch target addresses (and branch fetch addresses) corresponding to branch instructions B0 and B1 from branch scanner 58. During clock cycle CLK1, the corresponding branch predictions for branch instructions B0 and B1 are received.

Responsive to the prediction of branch instruction B0 as taken and the branch target address corresponding to branch instruction B0 being a forward branch target address outside of the predetermined range, forward collapse unit 68 transmits a cancel all signal to instruction queue 20, and provides the fetch address corresponding to branch instruction B0 as the range lower limit during clock cycle CLK1. As a result, as shown in clock cycle CLK2, the instructions subsequent to branch instruction B0 have been cancelled (i.e. instructions I1, I2, B1, I3, and I4). Since branch instruction B1 has been cancelled according to the prediction of branch instruction B0, the prediction for branch instruction B1 is ignored.

It is noted that, while the examples shown in FIGS. 6–10 have illustrated a run of instructions and branch target addresses within the run, forward collapse unit 68 may make similar determinations for forward branch target addresses outside of the run as long as the forward branch target addresses are within the predetermined range. Furthermore, in a case in which the first branch instruction is predicted not taken, the cancellation indications for the second branch instruction (if any) may be broadcast during the clock cycle in which the cancellation indications corresponding to the first branch instruction would otherwise have been broadcast.

Figure 11:
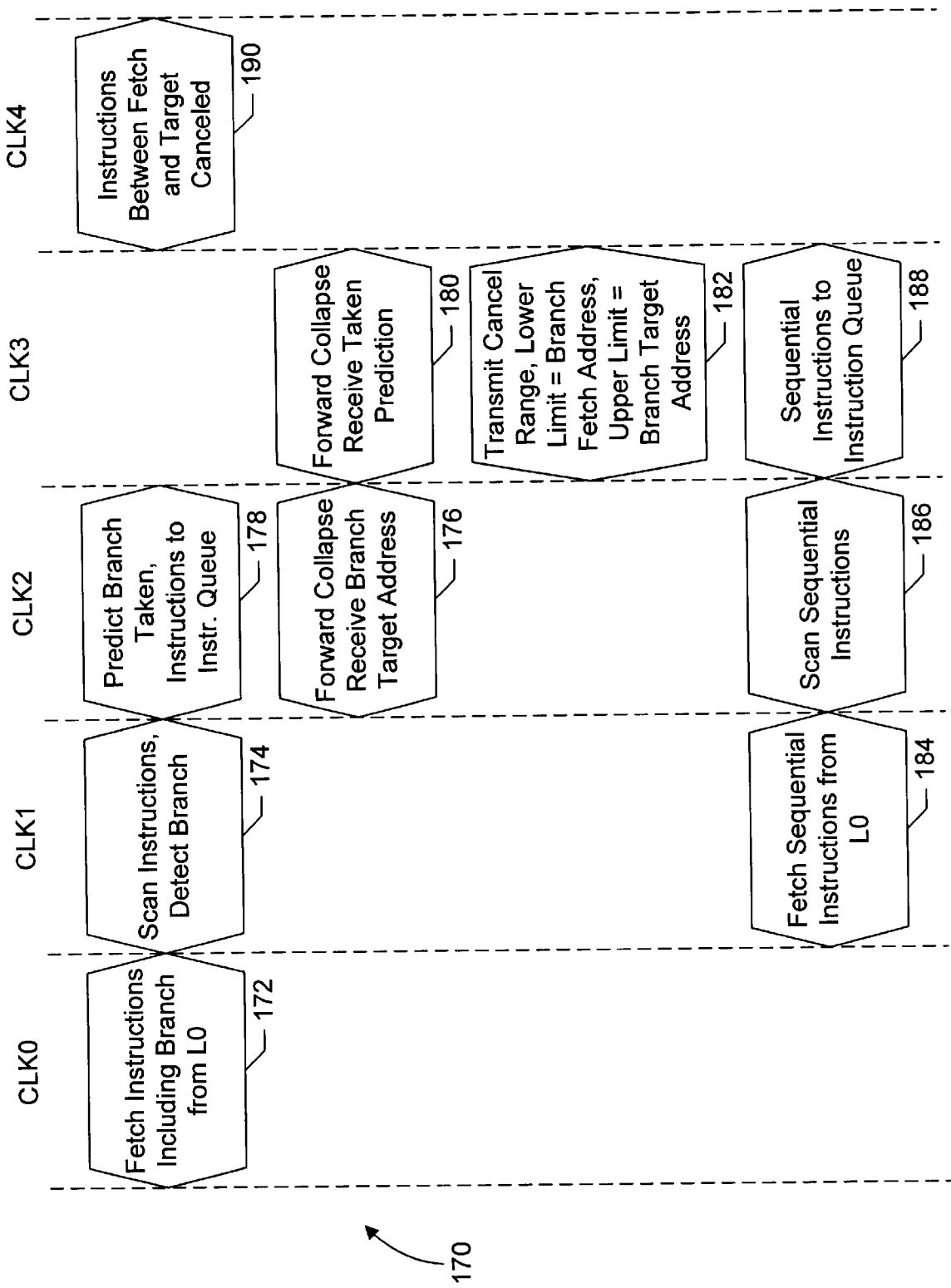
FIG. 11 is a timing diagram illustrating the fetch of instructions including a branch instruction having a forward target address and the fetch of subsequent instructions.

Turning now to FIG. 11, a timing diagram 170 is shown illustrating additional advantages which may be achieved by one embodiment of forward collapse unit 68 as employed within one embodiment of processor 10 as illustrated in FIGS. 1–3. Clock cycles in FIG. 11 are delimited by vertical dashed lines.

During clock cycle CLK0, a run of instructions including a branch instruction having a forward branch target address is fetched from L0 I-cache 16 (reference number 172). The run of instructions is scanned during clock cycle CLK1, and branch scanner 58 detects the branch instruction (reference number 174). Branch scanner 58 transmits the forward branch target address of the branch instruction to forward collapse unit 68 during clock cycle CLK2 (reference number 176) as well as transmitting the branch target address to prefetch control unit 50 and branch history table 60. Branch history table 60 provides a taken branch prediction corresponding to the branch target address in clock cycle CLK2 (reference number 178). Additionally, the instructions including the branch instruction are queued in instruction queue 20 during clock cycle CLK2.

Forward collapse unit 68 receives the taken branch prediction corresponding to the branch instruction during clock cycle CLK3 (reference number 180). Since the branch instruction is predicted taken and has a forward branch target address within the predetermined range, forward collapse unit 68 transmits a cancel range signal to instruction queue 20 along with a range lower limit set to the fetch address of the branch instruction and a range upper limit set to the branch target address (reference 182).

In parallel with the aforementioned events, L0 I-cache 16 continues to provide instructions responsive to fetch addresses provided by prefetch control unit 50. For example, during clock cycle CLK1, a sequential run of instructions to the run including the branch instruction is fetched (reference number 184). Because no branch prediction is received during clock cycle CLK1, prefetch control unit selects the sequential run of instructions via instruction select mux 54. Accordingly, during clock cycle CLK2, the sequential run of instructions is scanned by instruction scanner 56 and branch scanner 58 (reference number 186). The sequential run of instructions is queued within instruction queue 20 during clock cycle CLK3 (reference number 188). Instructions which are not predicted to be executed because they are between the branch instruction and the target instruction and a branch instruction is predicted taken are cancelled (reference number 190).

In the absence of the selective cancellation mechanism described above, the sequential run of instructions would not be fetched until clock cycle CLK2 (i.e. as part of the fetch of the branch target address of the branch instruction). However, since the selective cancellation mechanism is provided, the sequential instructions are actually fetched during clock cycle CLK1 and these instructions are retained while the instructions which are not predicted to be executed because the branch instruction is predicted taken and has a forward target address are cancelled from the instruction queue (as well as any subsequent and/or previous pipeline stages to which the instructions may have been dispatched).

Additionally, timing diagram 170 illustrates how the selective cancellation mechanism may be used in response to forward branch target addresses which extend beyond the end of the run including the branch instruction. The sequential run instructions is queued in instruction queue 20 during clock cycle CLK3 (reference number 188). Accordingly, instructions within the sequential instruction run may be selectively cancelled based upon the branch fetch address and branch target address of the predicted branch instruction. Furthermore, if desired, the cancellation ranges may be provided to instruction scanner 56 for selective cancellation of instructions being scanned as well. In this manner, larger forward target addresses may be handled by the selective cancellation mechanism. Such embodiments are contemplated. For example, an embodiment in which selective cancellation of instructions responsive to a forward target address of up to 64 bytes away from the branch fetch address is contemplated.

Figure 12:
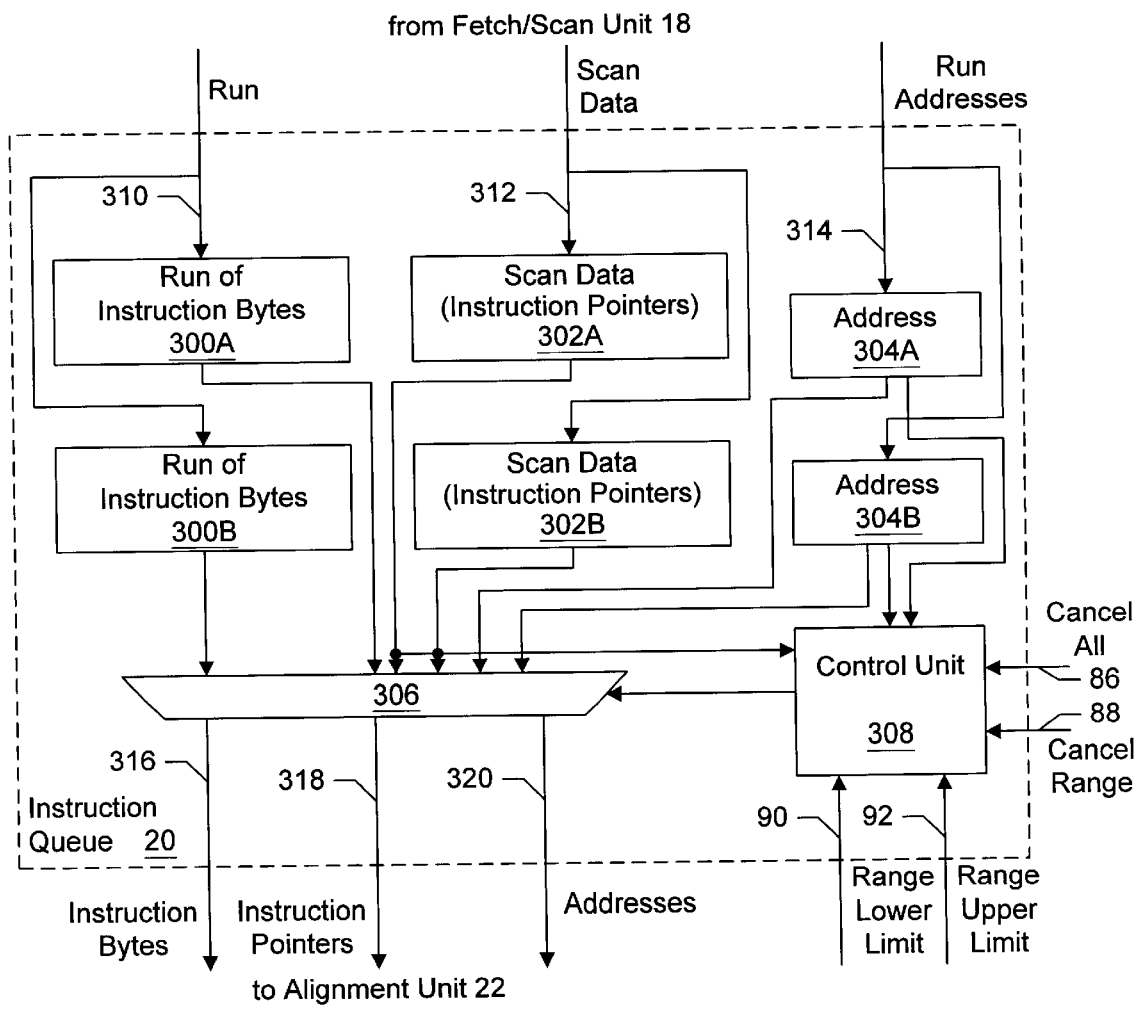
FIG. 12 is a block diagram of one embodiment of an instruction queue shown in FIG. 1.

Turning next to FIG. 12, a block diagram of one exemplary embodiment of instruction queue 20 is shown. Other embodiments are possible and contemplated. In the embodiment of FIG. 12, instruction queue 20 includes run storages 300A–300B, scan data storages 302A–302B, and address storages 304A–304B. Additionally, instruction queue 20 includes a mux 306 and a control unit 308. A run of instructions is provided to instruction queue 20 from fetch/scan unit 18 via a run bus 310; corresponding scan data is provided on a scan data bus 312; and corresponding addresses (one per run section) are provided on a run addresses bus 314. Instruction queue 20 provides a set of selected instruction bytes to alignment unit 22 on instruction bytes bus 316, pointers to instructions within the instruction bytes on an instruction pointers bus 318, and addresses for the run sections comprising the set of selected instruction bytes on an addresses bus 320. Run bus 310 is coupled to run storages 300A–300B, while scan data bus 312 is coupled to scan data storages 302A–302B and address storages 304A–304B are coupled to run addresses bus 314. Storages 300A–300B, 302A–302B, and 304A–304B are coupled to mux 306, which is further coupled to buses 316–320.

Control unit 308 is coupled to mux 306 and scan data storages 302A–302B.

Fetch/scan unit 18, and more particularly instruction scanner 56 according to the embodiment of FIG. 2, provides a run of instructions and associated information to instruction queue 20 via buses 310–314. Control unit 308 allocates one of run storages 300A–300B for the instruction bytes comprising the instruction run, and a corresponding, scan data storage 302A–302B and address storage 304A–304B for the associated information. The scan data includes instruction pointers which identify: (i) the start byte and end byte as offsets within a run section; as well as (ii) the run section within which the instruction resides. According to one particular embodiment, up to five instructions may be identified within an eight byte run section, and there are up to three run sections in a run for a total of up to 15 instructions pointers stored within a scan data storage 302. Additionally, address storages 304 store an address corresponding to each run section.

Control unit 308 examines the instruction pointers within scan data storages 302A–302B to identify instructions within a set of contiguous run sections for dispatch to alignment unit 22. In one particular embodiment, up to six instructions are identified within up to four contiguous run sections. The run sections may be stored in one of run storages 300A or 300B, or some run sections may be selected from one of run storages 300A–300B and the other run sections may be selected from the other one of run storages 300A–300B. A first run section is contiguous to a second run section if the first run section is next, in speculative program order, to the second run section. It is noted that mux 306, while illustrated as a single mux in FIG. 13 for simplicity in the drawing, may be implemented by any suitable parallel or cascaded set of multiplexors.

Control unit 308 provides a set of selection signals to mux 306 to select the set of run sections including the selected instructions, as well as the instruction pointers corresponding to the selected instructions. Additionally, the address for each selected run section is selected. The run sections are provided upon instruction bytes bus 316, while the corresponding instruction pointers and addresses are provided upon instruction pointers bus 318 and addresses bus 320, respectively.

Control unit 308 is further configured to invalidate instructions stored within instruction queue 20 in response to signals from forward collapse unit 68. Control unit 308 receives the range lower limit and range upper limit buses 90–92, as well as cancel all line 86 and cancel range line 88. Control unit 308 is further coupled to address storages 304A–304B and scan data storage 302A–302B. Between the run section addresses stored in storages 304A–304B and the start byte offsets stored in scan data storages 302A–302B, control unit 308 may determine the address of each instruction represented within instruction queue 20. These addresses may then be compared to the range lower limit and range upper limit values. If an instruction's start byte is stored at an address greater than the range lower limit address and the cancel all signal is asserted, control unit 308 invalidates the instruction within instruction queue 20. If an instruction's start byte is stored at an address greater than the range lower limit address and less than the range upper limit address and the cancel range signal is asserted, then control unit 308 invalidates the instruction within instruction queue 20. For example, each instruction may be indicated as valid via a valid bit within scan data storages 302A–302B and the valid bit may be set to an invalid state to invalidate the instruction.

It is noted that, since control unit 308 compares the address of the start byte of each instruction to the range lower limit address and checks for greater than, the branch instruction itself will not be invalidated. Similarly, since control unit 308 compares the address of the start byte of each instruction to the range upper limit address and checks for less than, the target instruction itself will not be invalidated.

Figure 13:
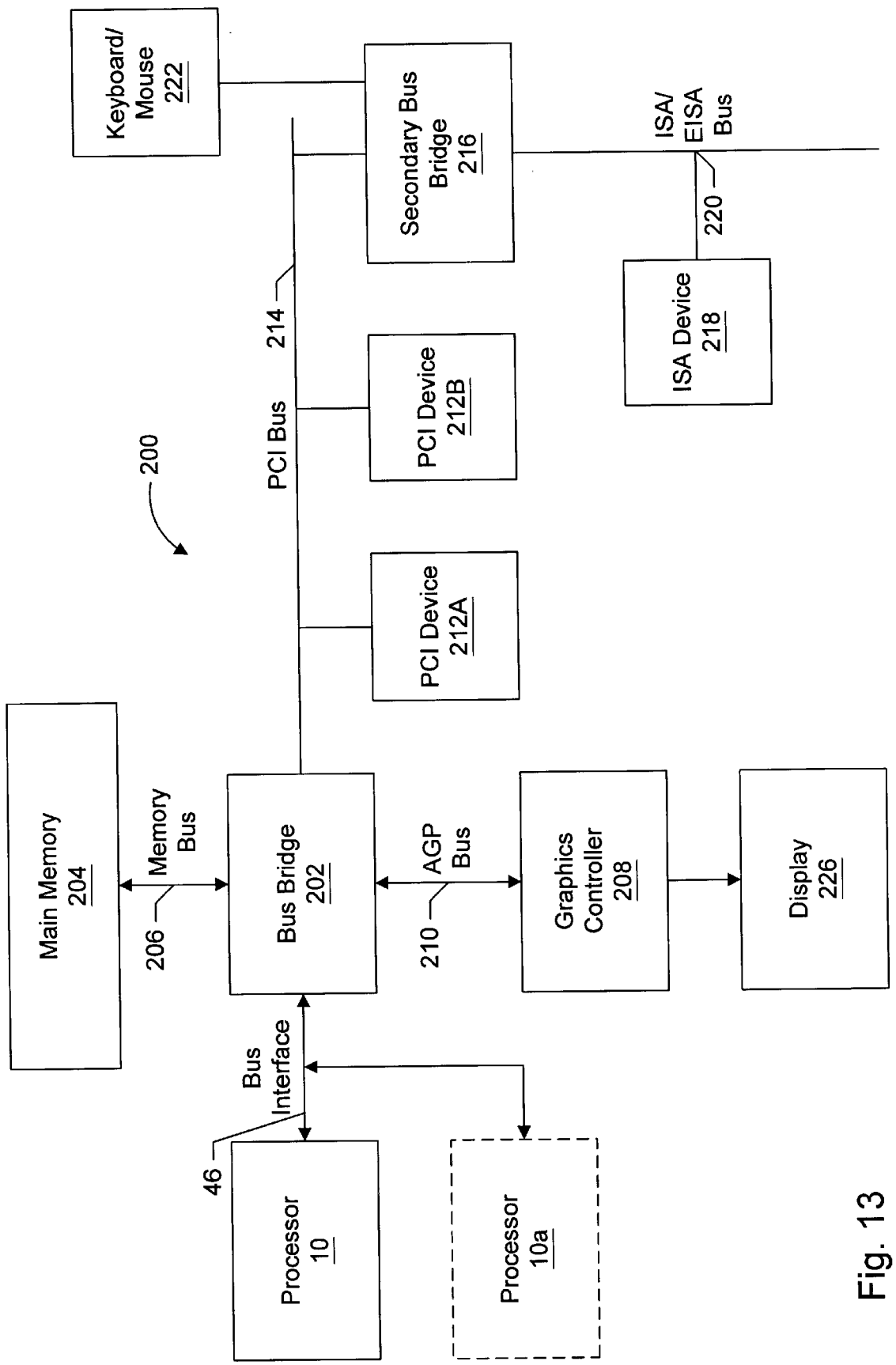
FIG. 13 is a block diagram of a computer system including the processor shown in FIG. 1.

Turning now to FIG. 13, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 13) or may be connected to bus bridge 202 via an independent bus.

In accordance with the above disclosure, a method for selectively invalidating and retaining instructions according to a forward branch target address of a branch instruction has been shown. Instead of discarding all instructions and fetching the branch target address, instructions which are not predicted to be executed are invalidated while other instructions are kept. Sequential fetching of the subsequent instructions may be performed. Fetch bandwidth may be increased due to the retaining of instructions already fetched from the branch target concurrent with the branch instruction and allowing sequential fetching of additional instructions to continue.

Numerous variations and modifications will become apparent to those skilled in the art once the above disclosure is fully appreciated. It is intended that the following claims be interpreted to embrace all such variations and modifications.

What is claimed is:

1. A method for fetching instructions in a processor, the method comprising:
   fetching a plurality of instructions;
   detecting a first branch instruction within said plurality of instructions, said first branch instruction having a forward branch target address;
   predicting said first branch instruction;
   canceling instructions from a pipeline of said processor prior to executing said instructions, said instructions being between said first branch instruction and a subsequent instruction within said plurality of instructions, said subsequent instruction being identified by said forward branch target address, wherein said canceling is responsive to said predicting selecting a taken prediction for said first branch instruction and said forward branch target address being within a predetermined range of a first branch fetch address corresponding to said first branch instruction; and
   retaining said subsequent instruction in said pipeline even if said predicting selects said taken prediction responsive to said forward branch target address being within said predetermined range.

2. The method as recited in claim 1 further comprising detecting a second branch instruction within said plurality of instructions and subsequent to said first branch instruction, said detecting said second branch instruction performed in parallel with said detecting said first branch instruction.

3. The method as recited in claim 2 further comprising predicting said second branch instruction.

4. The method as recited in claim 3 further comprising determining if said second branch instruction is still within said pipeline subsequent to said canceling.

5. The method as recited in claim 4 further comprising canceling instructions from said pipeline prior to executing said instructions, said instructions being subsequent to said second branch instruction within said plurality of instructions, said canceling responsive to said predicting said second branch instruction taken.

6. The method as recited in claim 5 wherein said canceling comprises selectively canceling instructions within said plurality of instructions between said second branch instruction and a second subsequent instruction identified by a second forward branch target address corresponding to said second branch instruction.

7. The method as recited in claim 1 wherein said canceling comprises identifying a range of addresses of instructions to be cancelled.

8. The method as recited in claim 7 wherein said range is delimited by an upper limit and a lower limit.

9. The method as recited in claim 8 wherein said lower limit comprises said first branch fetch address.

10. The method as recited in claim 8 wherein said upper limit comprises said forward branch target address.

11. The method as recited in claim 7 wherein said canceling further comprises comparing said upper limit and said lower limit to fetch addresses of said plurality of instructions.

12. The method as recited in claim 11 wherein said canceling further comprises canceling a particular instruction within said plurality of instructions if a corresponding fetch address of said particular instruction is greater than said lower limit and less than said upper limit.

13. A processor comprising:
   a branch scanner configured to identify a first branch instruction within a plurality of instructions;
   a branch history table coupled to said branch scanner, wherein said branch history table is configured to select a first branch prediction from a plurality of branch predictions stored therein responsive to said first branch instruction identified by said branch scanner; and
   a forward collapse unit coupled to said branch scanner and said branch history table, wherein said forward collapse unit is configured to indicate: (i) which instructions within said plurality of instructions and subsequent to said first branch instruction to cancel from a pipeline of said processor prior to executing said instructions, and (ii) which instructions within said plurality of instructions and subsequent to said first branch instruction to retain in said pipeline, said forward collapse unit responsive to said first branch prediction indicating taken and said first branch instruction having a forward branch target address within a predetermined range of a first branch fetch address corresponding to said first branch instruction.

14. The processor as recited in claim 13 wherein said branch scanner is configured to identify a second branch instruction in parallel with identifying said first branch instruction.

15. The processor as recited in claim 14 wherein said branch history table is configured to select a second branch prediction responsive to said second branch instruction.

16. The processor as recited in claim 15 wherein said forward collapse unit is configured to determine if said second branch instruction is still within said pipeline subsequent to canceling instructions responsive to said first branch instruction.

17. The processor as recited in claim 16 wherein said forward collapse unit is configured to indicate: (i) which instructions within said plurality of instructions and subsequent to said second branch instruction to cancel from said pipeline prior to executing said instructions, and (ii) which instructions within said plurality of instructions and subsequent to said second branch instruction to retain in said pipeline, said forward collapse unit responsive to said second branch prediction indicating taken and said second branch instruction having a forward branch target address within said predetermined range of a second branch fetch address corresponding to said second branch instruction.

18. The processor as recited in claim 13 wherein said forward collapse unit is configured to indicate which instructions to cancel and which instructions to retain by providing a range of addresses of instructions to be cancelled.

19. The processor as recited in claim 18 further comprising an instruction queue configured to store said plurality of instructions prior to dispatch thereof, wherein said instruction queue is coupled to said forward collapse unit, and wherein said instruction queue is configured to compare fetch addresses of said plurality of instructions to said range of addresses received from said forward collapse unit and to invalidate instructions having fetch addresses within said range of addresses.

20. The processor as recited in claim 13 wherein said branch scanner is coupled to receive predecode information including control transfer indications corresponding to said plurality of instructions and wherein said branch scanner is configured to identify said branch instructions by scanning said control transfer indications.

21. The processor as recited in claim 20 further comprising an instruction cache coupled to said branch scanner, wherein said instruction cache is configured to store said plurality of instruction bytes and said predecode information, and wherein said processor is configured to fetch said plurality of instruction bytes and said predecode information from said instruction cache.

22. A computer system comprising:
   a processor configured to fetch a plurality of instructions, wherein said processor is configured to identify a first branch instruction within said plurality of instructions, and wherein said processor is configured to: (i) cancel instructions from a pipeline of said processor prior to executing said instructions, and (ii) retain instructions within said plurality of instructions and subsequent to said first branch instruction in said pipeline, said processor configured to cancel and retain instructions responsive to predicting said first branch instruction taken and said first branch instruction having a forward branch target address within a predetermined range of a first branch fetch address corresponding to said first branch instruction; and
   an input/output (I/O) device coupled to said processor, wherein said I/O device is configured to communicate between said computer system and another computer system to which said I/O device is coupled.

23. The computer system as recited in claim 22 further comprising a second processor configured to fetch a plurality of instructions, wherein said second processor is configured to identify a first branch instruction within said plurality of instructions, and wherein said processor is configured to: (i) cancel instructions from a pipeline of said processor prior to executing said instructions, and (ii) retain instructions within said plurality of instructions and subsequent to said first branch instruction in said pipeline, said second processor configured to cancel and retain instructions responsive to predicting said first branch instruction taken and said first branch instruction having a forward branch target address within a predetermined range of a first branch fetch address corresponding to said first branch instruction.

24. A processor comprising:
- a branch prediction circuit configured to identify a first branch instruction within a plurality of instructions and to predict said first branch instruction; and
- a first circuit coupled to said branch prediction circuit, wherein said first circuit is configured, responsive to said first branch instruction having a forward target address within a predetermined range of a first branch fetch address corresponding to said first branch instruction and said branch prediction circuit predicting said first branch instruction taken: (i) to cancel a first one or more instructions within said plurality of instructions from a pipeline of said processor prior to executing said first one or more instructions, said first one or more instructions having fetch addresses between said first branch fetch address and said forward target address, and (ii) to retain a second one or more instructions in said pipeline, said second one or more instructions within said plurality of instructions and having fetch addresses which are not between said first branch fetch address and said forward target address.

25. The processor as recited in claim 24 wherein said plurality of instructions includes a second branch instruction subsequent to said first branch instruction, and wherein said branch prediction circuit is configured to predict said second branch instruction, and wherein said first circuit is configured to cancel and retain instructions responsive to said second branch instruction being predicted taken if said second branch instruction is retained in said pipeline responsive to said first branch instruction being predicted taken.

* * * * *